United States Patent
Sion et al.

(10) Patent No.: US 7,539,872 B2
(45) Date of Patent: May 26, 2009

(54) METHOD AND SYSTEM FOR RIGHTS ASSESSMENT OVER DIGITAL DATA THROUGH WATERMARKING

(75) Inventors: Radu Sion, Palo Alto, CA (US);
Mikhail Atallah, W. Lafayette, IN (US);
Sunil Prabhakar, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 972 days.

(21) Appl. No.: 10/852,674

(22) Filed: May 24, 2004

(65) Prior Publication Data
US 2005/0055554 A1 Mar. 10, 2005

Related U.S. Application Data

(60) Provisional application No. 60/472,904, filed on May 23, 2003, provisional application No. 60/555,183, filed on Mar. 22, 2004.

(51) Int. Cl.
*H04L 9/36* (2006.01)
(52) U.S. Cl. .................................. 713/176
(58) Field of Classification Search ............... None
See application file for complete search history.

(56) References Cited

U.S. PATENT DOCUMENTS 6,535,617 B1 * 3/2003 Hannigan et al. ........... 382/100

OTHER PUBLICATIONS

J. Kiernan & R. Agrawal, *Watermarking Relational Databases*, Proceedings of the 28th International Conference on Very Large Databases VLDB, 2002.

* cited by examiner

*Primary Examiner*—Gilberto Barron, Jr.
*Assistant Examiner*—Martin Jeriko P San Juan
(74) *Attorney, Agent, or Firm*—Brinks Hofer Gilson & Lione

(57) ABSTRACT

A system and method that provide resilient watermarking of digital data, including numeric and categorical relational data. The method and system are premised upon a framework considering the higher level semantics to be preserved in the original data. The system and method also provides a technique for enabling user-level run-time control over the properties that are to be preserved, as well as the degree of change introduced. The system and method are resilient to various important classes of attacks, including subset selection, addition, alteration, or resorting, horizontal or vertical data partitioning, and attribute remapping. For numeric relational data, approximately 40-45% of the embedded watermark may survive approximately 45-50% of original data loss, while for categorical relational data, the watermark may survive approximately 80% of original data loss with only approximately 25% degradation of the watermark.

14 Claims, 23 Drawing Sheets watermark(attribute, wm_key, mark_data[], plugin_handler, db_primary_key, subset_size, $v_{false}$, $v_{true}$, c)

sorted_attribute ← sort_on_normalized_crypto_hash(wm_key,db_primary_key,wm_key)

for (i=0; i < $\frac{length(attribute)}{subset\_size}$ ;i++)

subset_bin ← next subset_size elements from sorted_attribute compute rollback_data encode(mark_data[i % mark_data.length], subset_bin, $v_{false}$, $v_{true}$, c)

propagate changes into attribute if (not goodness-plugin_handler.isSatisfied(new_data,changes)) then rollback rollback_data continue else commit embedding_map[i] = true subset_boundaries[i] = subset_bin[0]

return embedding_map, subset_boundaries

Fig. 4

```
detect(attribute, wm_key, db_primary_key, subset_size, $v_{false}$, $v_{true}$, c, embedding_map[], subset_boundaries[])
    sorted_attribute ← sort_on_normalized_crypto_hash(wm_key,db_primary_key,wm_key)
    read_pipe ← null
    do { tuple ← next_tuple(sorted_attribute) }
    until (exists idx such that (subset_boundaries[idx] == tuple))
    current_subset ← idx
    while (not(sorted_attribute.empty())) do
        do {
            tuple ← next_tuple(sorted_attribute)
            read_pipe = read_pipe.append(tuple)
        } until (exists idx such that (subset_boundaries[idx] == tuple))
        subset_bin ← (at most subset_size elements from read_pipe, not including last read element)
        read_pipe.remove_all_remaining_elements_but_last_read()
        if (embedding_map[current_subset]) then
            mark_data[current_subset] ← decode (subset_bin, $v_{false}$, $v_{true}$, confidence)
            if (mark_data[current_subset] != DECODING_ERROR)
                then detection_map[current_subset] ← true
        current_subset ← idx
    return mark_data, detection_map
```

wm_embed($K,A,wm,k_1,k_2,e,$ECC)
    $wm\_data \leftarrow ECC.encode(wm, wm.length)$
    for $(j \leftarrow 1; j < N; j \leftarrow j + 1)$
        if $(H(T_j(K), k_1)) \bmod e = 0)$ then
            $t \leftarrow set\_bit(H(T_j(K), k_1), 0,$
                  $wm\_data[H(T_j(K), k_2)])$
            $T_j(A) \leftarrow a_t$ wm_embed_alternate($K,A,wm,k_1,e,$ECC)
    $wm\_data \leftarrow ECC.encode(wm, wm.length)$
    $idx \leftarrow 0$
    for $(j \leftarrow 1; j < N; j \leftarrow j + 1)$
        if $(H(T_j(K), k_1) \bmod e = 0)$ then
            $t \leftarrow set\_bit(H(T_j(K), k_1), 0, wm\_data[idx])$
            $T_j(A) \leftarrow a_t$
            $embedding\_map[T_j(K)] \leftarrow idx$
            $idx \leftarrow idx + 1$
    return $embedding\_map$

Fig. 12 wm_decode($K,A,k_1,k_2,e$,ECC)
    for ($j \leftarrow 1; j < N; j \leftarrow j+1$)
        if ($H(T_j(K), k_1)$ mod $e = 0$) then
        determine $t$ such that $T_j(A) = a_t$
        $wm\_data[msb(H(T_j(K), k_2), b(\frac{N}{e}))] = t\&1$
    $wm \leftarrow ECC.decode(wm\_data, wm.length)$
    return $wm$ wm_decode_alternate($K,A,k_1,e$,ECC,$embedding\_map$)
    for ($j \leftarrow 1; j < N; j \leftarrow j+1$)
        if ($H(T_j(K), msb(k, b(K)))$ mod $e = 0$) then
        determine $t$ such that $T_j(A) = a_t$
        $wm\_data[embedding\_map[T_j(K)]] = t\&1$
    $wm \leftarrow ECC.decode(wm\_data, wm.length)$
    return $wm$

Fig. 13

METHOD AND SYSTEM FOR RIGHTS ASSESSMENT OVER DIGITAL DATA THROUGH WATERMARKING

RELATED APPLICATIONS

This application claims the benefit of the filing date under 35 U.S.C. §19(e) of Provisional U.S. Patent Application Ser. No. 60/472,904 filed on May 23, 2003, and a related Provisional U.S. Patent Application Ser. No. 60/555,183 filed on Mar. 22, 2004, which are hereby incorporated by reference.

FEDERALLY SPONSORED RESEARCH OR DEVELOPMENT

The subject matter of this application was funded in part by the U.S. National Science Foundation (Grant nos. EIA-9903545, IIS-0325345, IIS-0219560, IIS-0312357, IIS-9985019, IIS-9972883, and IIS-0242421), the U.S. Office of Naval Research (Contract N00014-02-1-0364), and by sponsors of the Center for Education and Research in Information Assurance and Security. The government may have certain rights in this invention. Any opinions, findings, and conclusions or recommendations expressed in this publication do not necessarily reflect the views of the U.S. National Science Foundation, the U.S. Office of Naval Research, or the Center for Education and Research in Information Assurance and Security.

FIELD OF THE INVENTION

This application relates generally to watermarking digital data. More particularly, the application relates to methods and systems for protecting the intellectual property embodied within databases, as well as the accountability for the handling of the data therein.

BACKGROUND OF THE INVENTION

This application is directed to watermarking relational databases, such as numeric and categorical relational databases. It also may be applicable to watermarking digital data in general.

The primary purpose of digital watermarking is to protect certain content from unauthorized duplication and distribution by enabling provable ownership over the content.

Digital watermarking has traditionally relied upon the availability of a large noise domain within which the object can be altered while retaining its essential properties. For example, the least significant bits of image pixels can be arbitrarily altered with little impact upon the visual quality of the image as perceived by a human. In fact, much of the "bandwidth" for inserting watermarks, such as in the least significant bits, is due to the inability of the human sensory system to detect certain changes. However, while a considerable amount of research effort has been invested in the problem of watermarking multimedia data such as images, video, and audio, only limited research into watermarking numeric and categorical relational data has been done.

Protecting rights over outsourced digital content is of ever increasing interest, especially considering areas where sensitive, valuable data is to be sold or made directly accessible. For example, in data mining applications a set of data is usually produced and collected by a data collector and subsequently sold in pieces to parties specialized in mining that data. Other applications may include online interactions in which data is made available for direct, interactive use. Given the nature of most of the data, it is difficult to associate rights of the originator over it. Enforcement by legal means is usually ineffective in preventing theft of copyrighted works, unless augmented by a digital counterpart, such as watermarking.

Since a watermark modifies the item being watermarked, if the object cannot be modified then a watermark cannot be inserted. Thus, it is desirable to limit the change to acceptable levels with respect to the intended use of the data. However, one can always identify some use of the data that is affected by even a minor change to any portion of the data. Because of the nature of databases, they present unique challenges in limiting the change caused by a watermark to acceptable levels. One cannot rely upon "small" alterations to the data in the embedding process as any alteration is necessarily significant. Hence, the discrete characteristics of the data require fundamentally new bandwidth channels and associated encoding algorithms.

Moreover, in order to be effective, the watermarking technique must be able to survive a wide variety of attacks, for example subset selection, subset addition, subset alteration, and subset resorting. In subset selection, the attacker may randomly select and use a subset of the original data set that might still provide value for its intended purpose. In subset addition, the attacker adds a set of numbers to the original set. The addition of more numbers is not intended to significantly alter the useful properties of the initial set versus the resulting set. In subset alteration, a subset of the items in the original data set is altered such that there is still value associated with the resulting set. An example of subset alteration is linear transformation performed uniformly to all of the items. Such a transformation preserves many data-mining related properties of the data while actually altering it considerably. In subset resorting, the subsets are rearranged to attack a watermark dependent upon a predefined ordering.

In addition to the attacks identified above, possible attacks on categorical relational data also may include horizontal data partitioning, vertical data partitioning, or attribute remapping. In a horizontal data partitioning attack, an attacker can randomly select and use a subset of the original data set that might still provide value for its intended purpose. In a vertical data partitioning attack, an attacker selects a valuable subset of the attributes by vertical partitioning. Finally, data semantics permitting, remapping of the relation attributes may represent a powerful attack if the attacker finds at least a partial value-preserving mapping from the original attribute data domain to a new domain.

Accordingly, there is a need for protecting relational data, including both numeric and categorical relational databases, via resilient watermarking.

BRIEF SUMMARY

The invention provides a system and method for watermarking digital data, including both numeric and categorical relational data and is premised upon a framework considering the higher level semantics to be preserved in the original data. The invention also may provide a method for enabling user-level run-time control over the properties that are to be preserved, as well as the degree of change to be introduced. The system may be resilient to various important classes of attacks, including subset selection, addition, alteration, or resorting, horizontal or vertical data partitioning, and attribute remapping.

A method for watermarking digital data is provided that may include determining a secret ordering of data items by sorting the items based upon a cryptographic keyed hash. The hash may be determined by the most significant bits of the normalized items or, in the relational case, a hash of a selected attribute key.

A method for watermarking digital data is provided that may include receiving at least one user specified usability metric that limits the available bandwidth for watermark encoding. The method also may include selecting a number of subsets of data based upon a secret key in which to embed at least one watermark bit.

Further, a method for watermarking digital data is provided that may include determining which tuples are to be used in the encoding in accordance with a secret key. The method also may include embedding at least one watermark bit into each selected tuple in accordance with a secret key.

Advantages of the invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

BRIEF DESCRIPTION OF THE DRAWINGS

FIG. 4 is a watermark embedding algorithm;

FIG. 6 is a watermark detection algorithm;

FIG. 12 is a watermark encoding algorithm for categorical relational data;

FIG. 13 is a watermark decoding algorithm for categorical relational data;

DETAILED DESCRIPTION OF THE DRAWINGS AND THE PRESENTLY PREFERRED EMBODIMENTS

Figure 1:
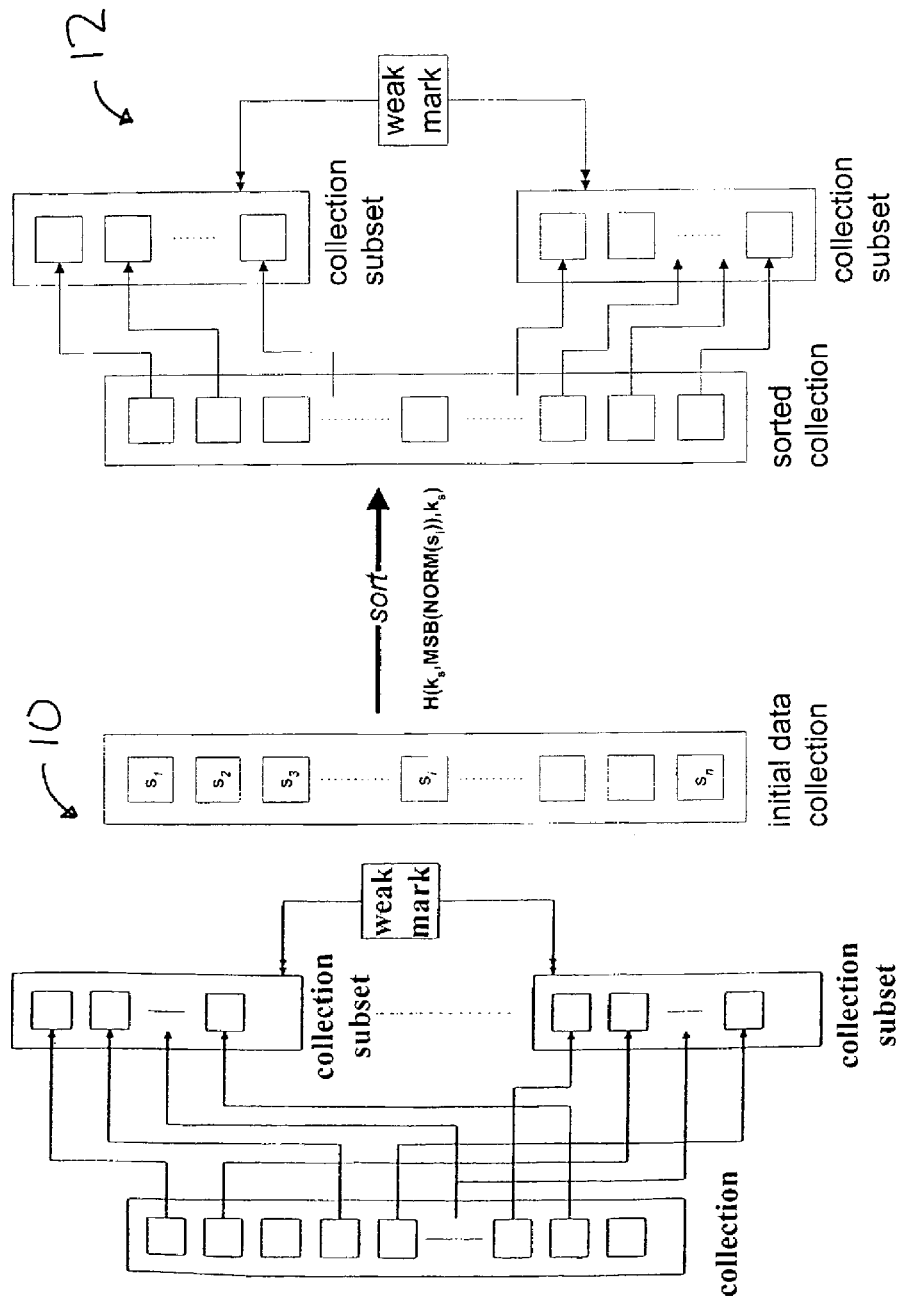
FIG. 1 is a depiction of the watermark power amplification routine.

A system and method are provided that provide resilient watermarking for digital data, including both numeric and categorical relational data. The system provides unique watermark embedding algorithms and enables user-level runtime control over the properties to be preserved and watermark encoding channels. Further, the system may produce resilient watermarks capable of surviving a number of various attacks, for example massive subset selection, subset addition, subset alteration, subset resorting, linear data changes, random item alterations, vertical and horizontal data partitioning, and attribute remapping.

One approach to watermarking a numeric relational database may be to characterize each numeric attribute as a set upon which a simple numeric set watermarking algorithm is to be applied. In order to avoid significant change, a mean square error or other bound may be specified for each attribute. However, this approach may significantly destroy the data, even though individual values are only modified minimally, as it does not consider the final data consumer (i.e., "usability") and the associated allowable distortion constraints. For example, two of the most common properties of relational data are primary keys and foreign keys. Applying the simple algorithm mentioned above, the primary key attributes in a relation may no longer be unique. Similarly, since attributes are watermarked independently, changes to the foreign key attributes may change the result of the join of the two tables. Thus, the usually low bandwidth (i.e., low tolerance to extensive changes) of major relational framework data customers requires a different approach, taking more carefully into account the actual tolerated changes.

One of the initial steps in inserting a watermark into a relational database, and thereby altering it, is to identify changes that are acceptable (the "available bandwidth"). The acceptable nature and level of change may be dependent upon the application for which the data is to be used. Defining a metric may permit determining whether the watermarking result is valuable and within the permitted error bounds. The available bandwidth for inserting bits of the watermark text is therefore not defined directly but rather is defined in terms of metrics. Insertion of the watermark may be characterized as successful if the watermarked data satisfies the metrics. If the watermark has been successfully inserted, the watermarked data may subsequently be identified as usable for the intended purposes, or being within the "usability" bounds.

One relevant example is the maximum allowable mean squared error case, in which the usability metrics may be defined in terms of mean squared error tolerances as follows:

$$(s_i - v_i)^2 < t_i \; \forall i = 1, \ldots, n \; \Sigma(S_i - v_i)^2 < t_{max}$$

where $S = \{s_1, \ldots, s_n\} \subset R$ is the data to be watermarked, $V = \{v_1, \ldots, v_n\}$ is the result, $T = \{t_1, \ldots, t_n\} \subset R$ and $t_{max} \in R$ define the guaranteed error bounds at data distribution time. T defines the allowable distortions for individual elements in terms of the mean squared error (MSE) and $t_{max}$ is the overall permissible MSE.

However, only specifying the allowable change of individual values, and possibly the overall limit, may not capture vital semantic features associated with the data, especially if the data is structured. For example, with age data, while a small change to the age values may be acceptable, it may be critical that individuals that are younger than 21 remain so even after watermarking if the data will be used to determine behavior patterns for underage drinking. Similarly, if the same data were to be used for identifying legal voters, the cutoff would be 18. For other applications, it may be important that the relative ages (which one is younger) not change. Other constraints may include (i) uniqueness—each value must be unique, (ii) scale—the ratio between any two numbers before and after the change must remain the same, and (iii) classification—the objects must remain in the same class, which may be defined by a range of values, before and after the watermarking.

Structured data collections, such as a collection of relations, present further constraints that must be adhered to by the watermarking algorithm. For example, with a data warehouse organized using a standard schema with a fact table and several dimension tables, the key relationships should be preserved by the watermarking algorithm. This may be accomplished by ensuring that tuples that join before watermarking also join after watermarking. Preferably, the new value for any attribute should be unique after the watermarking process. Hence, it is desirable to preserve the relationship between the various tables. The relationship may be expressed in terms of an arbitrary join condition, not just a natural join. Besides relationships between tuples, relational data also may have constraints within tuples. For example, if a relation contains the start and end times of an internet interaction, it may be important that each tuple satisfies the condition that the end time be later than the start time.

An attempt to destroy a watermark becomes much more effective if the values in which the watermark has been embedded are identifiable. In addition to specifying properties of the data that should be preserved for usability, constraints may be used to prevent easy detection of watermark locations. For instance, a tuple with a start time later than its corresponding end time or a customer less than 12 years old are very likely to be identified as the result of watermarking.

In order to be effective, the watermarking technique must be able to survive a wide variety of attacks. Given the type of possible attacks, several properties for a successful solution surface. For immunity against a subset selection attack, the watermark has to be embedded within the overall collection properties that survive subset selection (e.g., confidence intervals).

If the assumption is made that the attack alterations do not destroy the value of the data, then subset alteration attacks may be defeated by embedding the primitive mark within resilient global data properties. More particularly, a linear transformation attack may be defeated by a preliminary normalization step in which a common divider to all the items is first identified and applied. For a given item X, for notation purposes the "normalized" version of X is denoted by NORM (X) herein.

Additionally, successful subset recovery requires the ability to recognize most of the collection items before and after watermarking and/or an attack. An item and its corresponding subset must be "recognized" after it has been modified slightly. While this requirement partially defeats all of the attacks mentioned above, it is especially important as a defense to subset resorting attacks.

The foundation of a primitive numeric collection watermarking procedure that is incorporated as a subroutine in the main watermarking algorithm is discussed below. The foundation is general in nature and not restricted to the relational data base realm.

S may be defined as a set of n real number $S=\{s_1, \ldots s_n\} \subset R$. The general simplified problem of watermarking the set S may then be defined as finding a transformation from S to another item set V, such that, given all possible imposed usability metrics sets $G=UG_i$ for any and all subsets $S_i \subset S$, that hold for S, then after the transformation yields V, the metrics should hold also for V. Hence, V is the "watermarked" version of S. If G is given and holds for the initial input data, S, then G should also hold for the resulting data V. Thus, $V=\{v_1, \ldots v_n\} \subset R$ is the result of watermarking S by minor alterations to its content. A string of bits w of size m<<n may be the desired watermark to be embedded into the data ($|w|=m$), where $w_i$ denotes the $i^{th}$ bit of w.

Preferably, the allowable change to the content of the data is determined. For a numeric collection, a natural starting point for defining the allowed change is to specify an absolute or relative change in value. For example, each value may be altered by no more than 0.0005 or 0.02%. Moreover, a bound on the cumulative change may be specified. The solution for the simplified problem may consist of several steps. First, a resilient method for item labeling may be utilized, enabling the ability to "recognize" initial items at watermarking detection time, which is after watermarking and/or possible attacks. Second, attack survivability may be increased by "amplifying" the power of a given primitive watermarking method. The amplification effect may be achieved by deploying secrets in the process of selecting the subsets which become input for the final stage, during which a primitive encoding method may be utilized.

One solution for the simplified problem includes encoding, and subsequently decoding, a watermark. To encode the watermark, a maximal number of unique, non-intersecting subsets of the original set may be selected using a set of secrets. For each subset, a watermark bit may be embedded using the encoding convention detailed below. Subsequently, the subset may be checked to determine if the data usability bounds have been exceeded. If the usability bounds have been exceeded, encoding may be retried with a different encoding parameter variation. If the usability bounds remain exceeded, an attempt to mark the subset as invalid may be performed, or if still no success, the current subset may be ignored. Ignoring the current subset will leave an invalid watermark bit encoded in the data that may be corrected by an error correction mechanism at extraction time. The routine may be repeated until no more subsets are available for encoding. This may result in multiple embeddings in the data. Furthermore, different levels of granularity may be possible. For example, checking for data usability may be done at an even more atomic level, such as inside the bit-encoding procedure.

To decode the watermark, using the secrets from the encoding algorithm, a majority of the subsets considered during encoding may be recovered. For each considered subset, using the encoding convention discussed below, the embedded bit value may be recovered and the watermarks may be reconstructed. Reconstructing the watermarks may produce a set of copies of the same watermarks with various potential errors. Accordingly, a set of error correcting mechanisms may be utilized to recover the highest likelihood initial mark.

Watermarking a data collection requires the ability to "recognize" most of the collection items before and after watermarking and/or a security attack. This ability is particularly important as a defense to subset resorting attacks. If an item was accessed or modified before watermarking, for example, being identified with a certain label L, then at watermark detection time, the same item is identified with the same label L or a known mapping to the new label.

More generally, it is preferable to identify a majority of the initial elements of a subset after watermarking and/or attacks. This feature provides a watermark detection technique that is resilient to "missing" a small number of items.

The system and method may be based upon lexicographically sorting the items in the collection, sorting occurring based upon a one-way, secretly keyed, cryptographic hash of the set of most significant bits (MSB) of the normalized version of the items. The secret one-way hashing ensures that an attacker cannot determine the ordering. During watermark amplification, discussed below, subset "chunks" of the items are selected based upon this secret ordering. This defeats subset resorting attacks, as well as any attempts at statistical analysis to determine the secret subsets. Chunk-boundaries or "subset-markers" are then computed and stored for use during watermark detection time.

More specifically, given a collection of items as above, $S=\{s_1, \ldots s_n\} \subset R$ and a secret "sorting key" $k_s$, a secret ordering on the collection may be imposed by sorting according to a cryptographic keyed hash of the most significant bits (MSB) of the normalized items. The hash may produce a table having an index characterized as $index(s_i)=H(k_s, MSB(NORM(s_i)), k_s)$.

The MSB space is assumed to be a domain where minor changes on the collection items, i.e., changes that still satisfy the given required usability metrics, have only minimal impact upon the MSB labels. This is true in many cases as usually the usability metrics are related to preserving the important parts of the original data. If not suitable, a different labeling space may be employed, for example, as set forth above, one where minor changes on the collection of items have only minimal impact. Additionally, in the relational data framework, the existence of a primary key associated with the given attribute to be watermarked may make it easier to impose a secret sorting upon the data.

FIG. 1 illustrates a general watermark power amplification routine. The first stage 10 of FIG. 1 shows a keyed selection of subsets, which assumes the ability to uniquely and consistently identify items before and after watermarking and/or attacks. The second stage 12 of FIG. 1 shows subset selection after sorting on a keyed hash of the most significant bits (MSB) of the normalized data items, which enables recovery after various attacks.

Watermarking algorithms may derive most of their power from a secret that controls watermark embedding, i.e., a watermarking key. Much of the attack immunity associated with a watermarking algorithm may be based upon this key and its level of secrecy. Given a weak partial marking technique, such as resetting a bit, a strong marking method may be derived by a method of "mark amplification," which is repeatedly applying the weak technique in a keyed fashion on different parts of the data being watermarked.

For a generic solution, $K=\{k_1, \ldots, k_m\}$ may be defined as a set of m keys on n bits each and $S_i=\{s_j \epsilon S | (k_i)_{bitj}=1\}, i=1, \ldots, m$. Each $S_i \subset S$ may be defined by selecting a subset of S fully determined by it's corresponding key $k_i \in K$, as illustrated in FIG. 1.

The main purpose of this step is to amplify the power of the general watermark. The subsequent step will simply consider each $S_i$ to be marked separately by building upon a general watermarking method. The result will be at least a m-bit (i.e., $i=1, \ldots, m$) overall watermark bandwidth (unless multiple embeddings and majority voting, for error correcting purposes, are considered) in which each bit is embedded within each marked $S_i$.

The generic solution above works well for situations where the exact item labeling is available and concerns of subset addition or selection attacks are absent. The solution discussed below takes into account these concerns.

In one detailed solution, given a collection of items as above, $S=\{s_1, \ldots, s_n\} \subset R$, and a secret "sorting key" $k_s$, a secret ordering is imposed upon the items by sorting according to a cryptographic keyed hash of the most significant bits of the normalized items, e.g., $index(s_i)=H(k_s, MSB(NORM(s_i)), k_s)$. Subsequently, subsets, $S_i$, are built as "chunks" of items, a "chunk" being a set of adjacent items in the sorted version of the collection, as illustrated in FIG. 1.

As such, the ability to defeat different types of attacks may be increased, including "cut" and/or "add" attacks (e.g., subset addition and alteration), by "dispersing" their effect throughout the data as a result of the secret ordering. Hence, if an attack removes 5% of the items, each subset $S_i$ becomes roughly 5% smaller. If $S_i$ is small enough and/or if the primitive watermarking method used to encode parts of the watermark (i.e., 1 bit) in $S_i$ is made resilient to these kind of minor transformations, then the probability of survival of most of the embedded watermarks increases. Additionally, in order to provide resilience to massive "cut" attacks, the subset "chunks" may be selected to be of sizes equal to a given percent of the overall data set, as opposed to fixed absolute sizes. This provides the subset selection scheme with adaptability to such attacks, assuring subsequent retrieval of the watermark even from only a portion of the original data.

After the power of the watermark is amplified, the next step may be to consider each $S_i$ to be marked separately by building upon a general watermarking method. The result will be a m-bit (i.e., $i=1, \ldots, m$) overall watermark bandwidth in which each bit is embedded within each of the marked $S_i$. Once each of the to-be-watermarked secret (keyed) sets $S_i$ are defined, the problem may be reduced to finding a reasonable, not-very-weak (i.e., better than "coin-flip," random occurrence) algorithm for watermarking a medium-sized set of numbers.

A system and method is provided that provides a watermark encoding method with the ability to retrieve the encoded information ("blindly") without having the original data. This may be important, especially in the case of very large dynamic databases, where data mining portions were outsourced at various points in time and it is unreasonable to store each outsourced copy of the original data.

Figure 2:
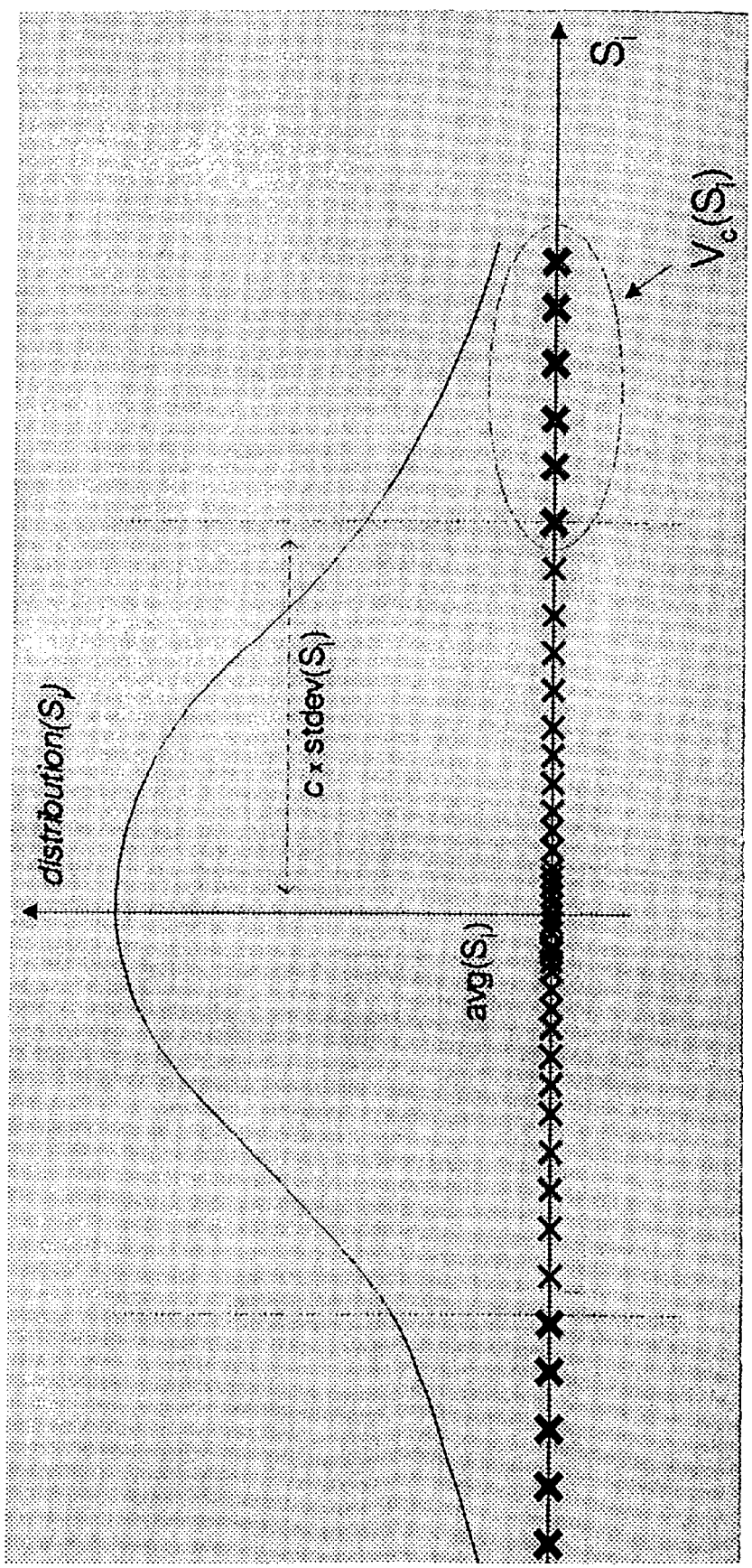
FIG. 2 is a distribution of a watermarked item set.

FIG. 2 illustrates the distribution of the item set $S_i$. As described below, the encoding of the watermark bit relies upon altering the size of the positive violators set, $v_c(s_i)$.

A single bit may be encoded into each selected subset of the data. In one aspect, $S_i$, one of the subsets secretly selected in the previous step, as well as the value of a watermark bit b that is to be encoded into $S_i$, are initial inputs to the encoding routine and G represents the set of user specified change tolerances, or usability metrics.

The system may define $v_{false}$, $v_{true}$; $c \epsilon (0,1)$, $v_{false} < v_{true}$ as real numbers (e.g., $c=90\%$, $v_{true}=10\%$, $v_{false}=7\%$). c is a "confidence factor" and the interval $(v_{false}, v_{true})$ is termed a "confidence violators hysteresis." These values, which are stored and used at watermark detection time as well, constitute part of the encoding key.

The system may define $avg(S_i)$ and $\delta(S_i)$ to be the average and standard deviation, respectively, of $S_i$. Given $S_i$ and the real number $c \in (0,1)$ as above, $v_c(S_i)$ may be defined as the number of items of $S_i$ that are greater than $avg(S_i)+c \times \delta(S_i)$. $v_c(S_i)$ is the number of positive "violators" of the c confidence factor over $S_i$, as shown in FIG. 2.

A mark encoding convention may be defined. In one aspect, given $S_i$, C, $v_{false}$ and $v_{true}$ as above, the encoding convention may be defined as $mark(S_i) \epsilon \{true, false, invalid\}$ to be true if $v_c(S_i) > (v_{true} \times |S|)$, false if $v_c(S_i) < (v_{false} \times |S_i|)$ and invalid if $v_c(S_i) \epsilon (v_{false} \times |S_i|, v_{true} \times |S_i|)$. Thus, the watermark may be modeled by the percentage of positive "confidence violators" present in $S_i$ for a given confidence factor c and confidence violators hysteresis ($V_{false}$ and $V_{true}$).

Therefore, encoding the single bit, b, into $S_i$ may be achieved by making minor changes to some of the data values in $S_i$ such that the number of positive violators ($v_c(S_i)$) is either (1) less than $v_{false} \times |S_i|$ if $b=0$ or (2) more than $v_{true} \times |S_i|$ if $b=1$. The changes made to the data should not violate the user specified change tolerances, G.

Encoding the watermark bits into actual data distribution properties, as opposed to directly into the data itself, presents a set of advantages, the most important of which is increased resilience to various types of numeric attacks as compared to the fragility of direct data domain encoding.

One algorothm may perform the required item alterations while satisfying the given "usability" metrics, G, by utilizing the primitive watermarking step (e.g., for $S_i$) and then checking for data usability with respect to G. If the tolerances are exceeded, the algorithm ignores $S_i$ and considers the next secretly selected subset to encode the rest of the watermark. This may result in errors or misses in the encoded marks but by utilizing error correction techniques, most of the errors may be eliminated in the result.

The size of the subsets selected in the amplification step (i.e., $|S_i|$) may be varied. When the system embeds 1 bit per subset, a trade off may be observed between larger sets, which are tolerant to more data alteration attacks but have a small bandwidth, and smaller sets, which are more "brittle" to attacks but have a larger encoding bandwidth. The determination of subset size may be considered as a fine-tuning step for the particular data usability metrics provided. If the metrics are too restrictive, more items will be needed inside $S_i$ to be able to encode one bit while preserving the required usability. On the other hand, if the usability metrics are more relaxed, $S_i$ can be very small, sometimes even 10-15 items, enabling more encoding bandwidth overall.

Figure 3:
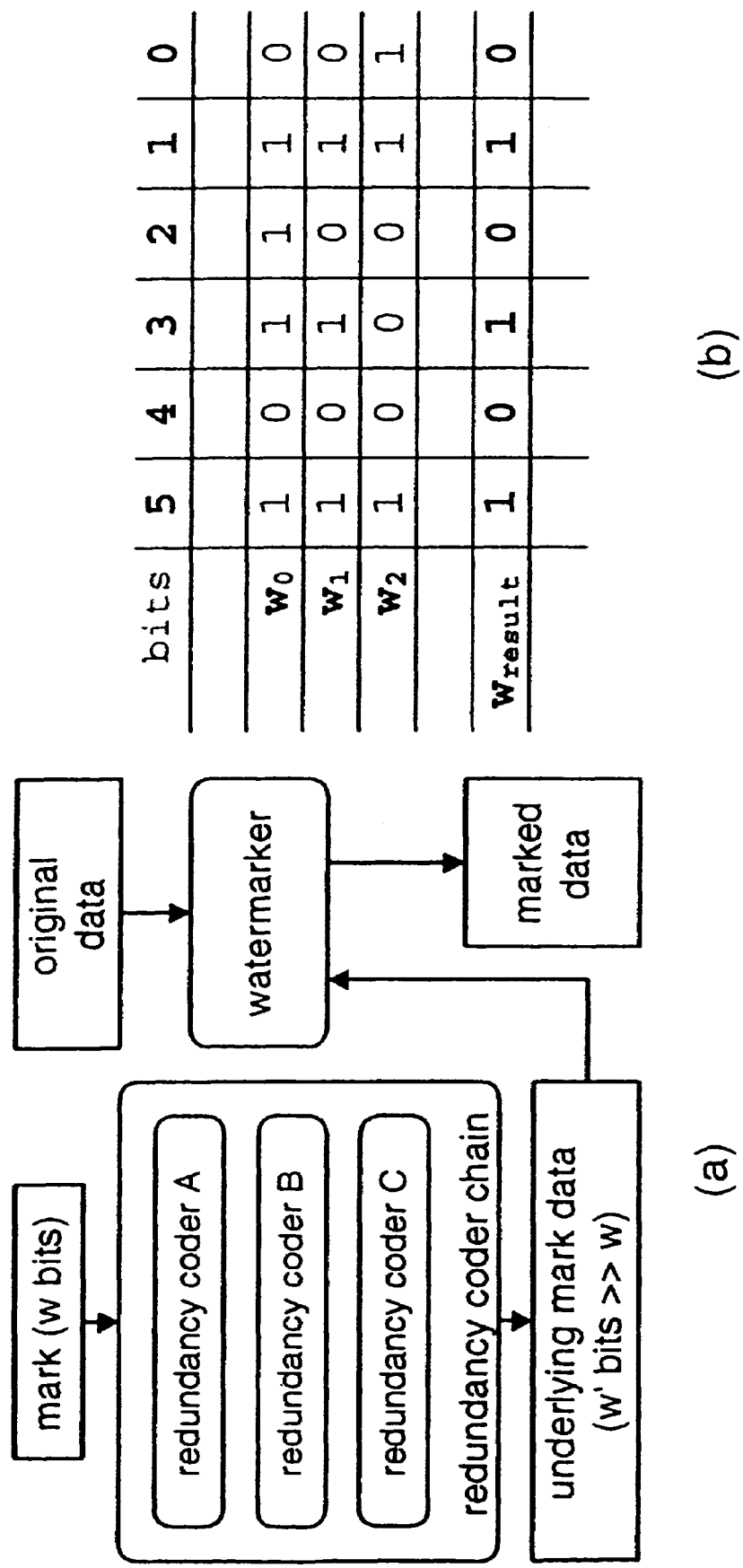
FIG. 3 is a depiction of an application of error correcting plug-ins.

At watermark detection time, after recovering all of the watermark copies from the given data, error correction, such as majority voting, may be employed over all the recovered watermark bits to determine the most likely initial watermark bits. FIG. 3 illustrates that different error correcting plug-ins may added or removed at runtime in order to provide an increased level of resilience for the original watermark to be embedded. FIG. 3 also shows majority voting over three recovered watermark copies for a 6 bit sized original watermark.

As the watermark embedding progresses, a certain embedding aggressiveness factor increases, resulting in the actual changes becoming more and more up to the permitted limit and not only as required. The watermarked data is brought as close as possible to the allowable distortion bounds ("usability vicinity" limits), which may help make the usability of the watermarked data as fragile as possible against any attack. As a result, an attacker with the intent of removing or altering the watermark may be faced with the fact that any further alterations performed have an increased likelihood of making the data invalid with respect to the guaranteed usability metrics (because the watermarking process has already altered the data up to its usability metrics limits), potentially removing its value.

Resilience and attack-ability bounds of the watermarking algorithm by relating the required damage for a successful attack to the maximum permissible damage levels may be computed. A primitive 1-bit encoding method for subsets of subset size denoted by s may be resilient to a minimum s×l random "surgeries" (data item removals and/or alterations), l ∈ R. This resilience may be guaranteed by varying the encoding parameters presented above.

For the resiliency analysis, a general scenario was assumed with no assigned values for l and an error correcting mechanism (e.g., majority voting) is able to correct $$e \times \frac{n}{s} \times \frac{1}{m}$$

bit errors where, as above, n is the number of total items in the input set, m is the bit-size of the watermark to be embedded, and e ∈ R, e≧2. Hence, e naturally models the error correcting power proportional to the ratio of total available bandwidth to watermark size. In order to keep a maximum degree of generality, no values for e were assigned at this point either.

The resiliency analysis algorithm may define P(s, a") as the average success probability (i.e., actual bit-flip) of a random, a "sized (i.e., a" surgeries) attack on a 1-bit encoding subset of size s. The assumption of resilience to l surgeries of the subset encoding may be expressed as P(s, x)=0, $\forall x \leq l$. First, the local (i.e., at the subset level) amount of surgeries required in the case of an a-sized global attack on the entire marking scheme was computed. Because of the additional sorting and one-way hashing step discussed above, for illustrative purposes, a simplifying assumption is discussed, namely, that of a uniform distribution of all the surgeries among the individual subsets. That is, in the following, $$a'' = a \times \frac{s}{n}.$$

The probability of an a-sized attack affecting (e.g., flipping) exactly t bits in the underlying data bandwidth, before error correction, $P_t(s, a)$ is:

$$P_t(s, a) = C^t_{\frac{n}{s}} \times (s, a'')^t \times (1 - P(s, a''))^{n-t}.$$

Given the e-bit error correction ability, the probability that one watermark bit is altered by an a-sized attack becomes:

$$P_1(a) = 1 - \sum_{i=1}^{e} \frac{e}{i!}(P_i(s, a)).$$

Again, P(s, a") actually represents the average success probability of a random, a" sized attack on a 1-bit encoding subset of size s and there is the assumption of resilience to l surgeries of the subset encoding.

On average, P(s, x)=0, $\forall x \leq l$ and a">l may be assumed. Then, approximately, $$P(s, a'') = q \times \frac{a'' - 1}{s}, \forall a'' \in (l, s), \text{ where } q \in R, q \geq 1$$

is a input data characteristic normalization constant. Hence, $$P(s, a) = C^t_{\frac{n}{s}} \times \left(q \times \frac{a'' - l}{s}\right)^{n-t}.$$

As an example, by substituting t=1, n=10,000, s=50, a =1,000, l=4, q=1, and continuing the computation, the following result is obtained.

$$P1(50, 1,000) = \frac{1}{200} \times \frac{1}{50} \times \left(\frac{49}{50}\right)^{9,999} \simeq 1.86 \times 10^{-92} \simeq 0,$$

Hence, there is a surprisingly low probability of destroying one bit in the underlying data by a 1,000-sized attack on an input set of 10,000 where the subsets are of size 50 and subset encoding is tolerant to at least four item surgeries. Thus, for a 10,000 tuples item set, an encoding with subsets of size 50 and an average 1-bit subset encoding tolerance to 6% data item losses (experimental results show usually up to 25-30% loss tolerance).

In the relational database setting, structural and semantic properties of the data should be preserved. Sometimes, it is undesirable or even impossible to map higher-level semantic constraints into low-level (combined) change tolerances for individual tuples or attributes. However, not all constraints of the database need to be specified. For example, in certain scenarios, a practical approach would be to begin by specifying a mean square error bound on individual items. Further semantic or structural constraints that the final data consumer would like to preserve also may be added.

However, the practically infinite nature of the potential constraints that may be desired or imposed upon a given data set requires a different, more versatile, "data goodness" (i.e., semantically) assessment method. One method provides data goodness assessment. Each property of the database needed to be preserved may be written as a constraint on the allowable change to the dataset. The watermarking algorithm presented earlier may be subsequently applied with these constraints as input.

Constraints that arise from the schema, mainly key constraints, may easily be specified in a form similar to, or derived from, SQL create table statements. In addition, integrity constraints, such as the end time being greater than the start time, may be expressed. A tolerance or usability metric may be specified for each constraint. The tolerance is the amount of change or violation of the constraint that is acceptable. This is an important parameter since it may be used to tailor the quality of the watermark (at the expense of greater change in the data). Yet, if the tolerances are too low, it may not be possible to insert a watermark in the data.

In order to handle a very wide variety of constraints, one method allows various forms of expression, e.g., in terms of arbitrary SQL queries over the relations, with associated requirements (usability metric functions). For example, the requirement that the result of the join, natural or otherwise, of two relations does not change by more than 3% may be specified. Using this approach, any changes made by the watermarking algorithm may be ensured to not violate the required properties.

FIG. 4 illustrates one algorithm outline for watermarking relational data. The algorithm proceeds as follows: (1) user-defined queries and associated guaranteed query usability metrics and bounds are specified with respect to the given database, (2) user input determines a set of attributes in the database considered for watermarking, possibly all, and (3) for each selected attribute, the simplified algorithm is utilized where, instead of checking for local data usability, the algorithm simply checks all global user-defined queries and usability bounds by execution.

An additional benefit of operating in the relational data domain is the ability to use the actual relation key in the secret subset selection procedure, instead of the proposed most significant bits of the data (i.e., watermarked attribute data). It is highly unlikely that an attack will entirely change the database schema and replace the key attribute. Thus, for most applications, it might be an appropriate idea to use it or its MSB space, especially in cases where the actual data is subject to lax usability metrics, i.e., making the data MSB domain less reliable.

The system presents a solution that handles each of the constraints that need to be preserved as an inherent component for the watermarking algorithm. At watermarking time, data quality is continuously assessed as an intrinsic part of the marking algorithm itself. This maintains 100% of the associated data with respect to a set of given required data goodness constraints, which is vital to any watermarking application in the low-noise, high fragility domain of relational data, especially considering data-mining issues, such as classification and JOIN results preservation.

The system may deploy means for data distribution manipulation, encoding the actual information in distribution properties of the data rather than directly into the data itself, and allowing an adjustable degree of freedom in altering the usability metrics, while at the same time providing a surprisingly high level of resilience to attacks. The system may be built around a framework considering higher level semantics to be preserved in the original data. Furthermore, the requirement of the prior art that the least significant bit (LSB) in any tuple be altered has limited applicability and cannot be applied for many important applications, such as data mining, that require the preservation of classification.

Preferably, a watermarking method should start by assessing the final purpose of the content to be watermarked, together with its associated allowable alteration limits. These limits are often impossible to express as least significant bits and require higher level semantic expression power, which is offered by data goodness plug-ins.

The algorithms of the system related to watermarking numeric relational data are enabled using the Java language and use the JDBC API in accessing the data. One implementation program receives as input a watermark to be embedded, a secret key to be used for embedding, a set of relations and attributes to consider in watermarking, and a set of external usability plug-in modules. The plug-in modules allow user-defined query metrics to be deployed and queried during runtime without recompilation and/or software restart. Usability metrics may be specified as either as SQL queries, stored procedures, or simple JAVA or other code inside the plug-in modules.

Figure 5:
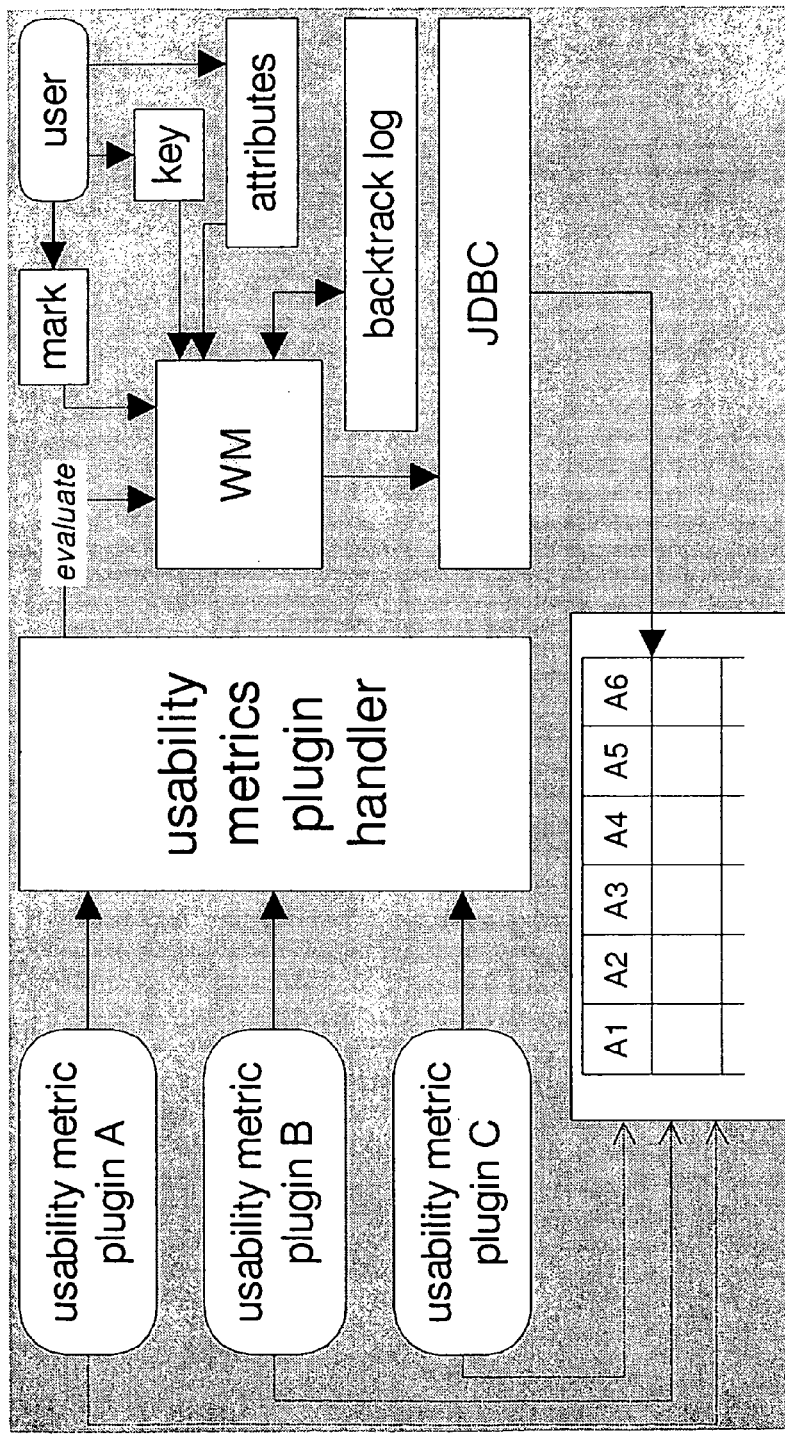
FIG. 5 is a depiction of a watermarking module.

As illustrated in FIG. 5, after the usability metrics are selected and all other parameters are determined, the watermarking module may initiate the process of watermarking. An undo or rollback log may be kept for each atomic step performed (i.e., 1-bit encoding) until data usability is assessed and confirmed by querying the currently active usability plug-ins. This allows for rollbacks in the case when data quality is not preserved by the current atomic operation.

FIG. 6 illustrates that the watermark recovery algorithm may receive as input the watermarking key used during embedding, the set of attributes known to contain the watermark, and various other encoding specific parameters. The set of watermark copies initially embedded may be recovered. A final step of error correction over the recovered copies may complete the recovery process.

The experimental database contained information regarding item sales for a nationwide merchant. Experiments involving attacks, such as data loss, data alterations, linear changes, and data resorting, as well as the evaluation of the available bandwidth in the presence of different data goodness metrics (tolerable absolute change and data classification preservation) were performed.

In the following examples, the resilience of the watermark was analyzed. The watermarking scheme was subjected to various attacks, randomly occurring changes, and goodness metric constraints. The examples are exemplary and presented for purposes of illustration only. These examples are not intended to be limiting in any sense.

EXAMPLE 1

Figure 7A:
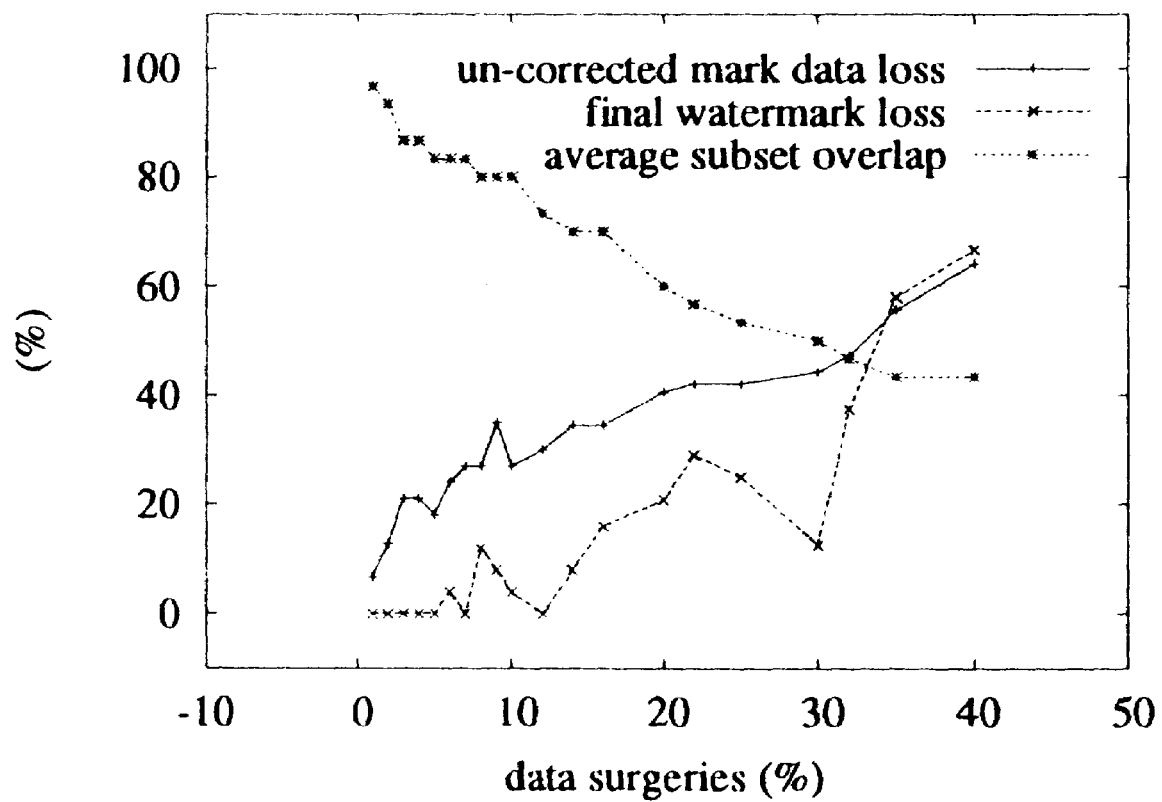
FIG. 7 is a depiction of the resiliency of a watermarked item to data loss attacks.
Figure 7B:
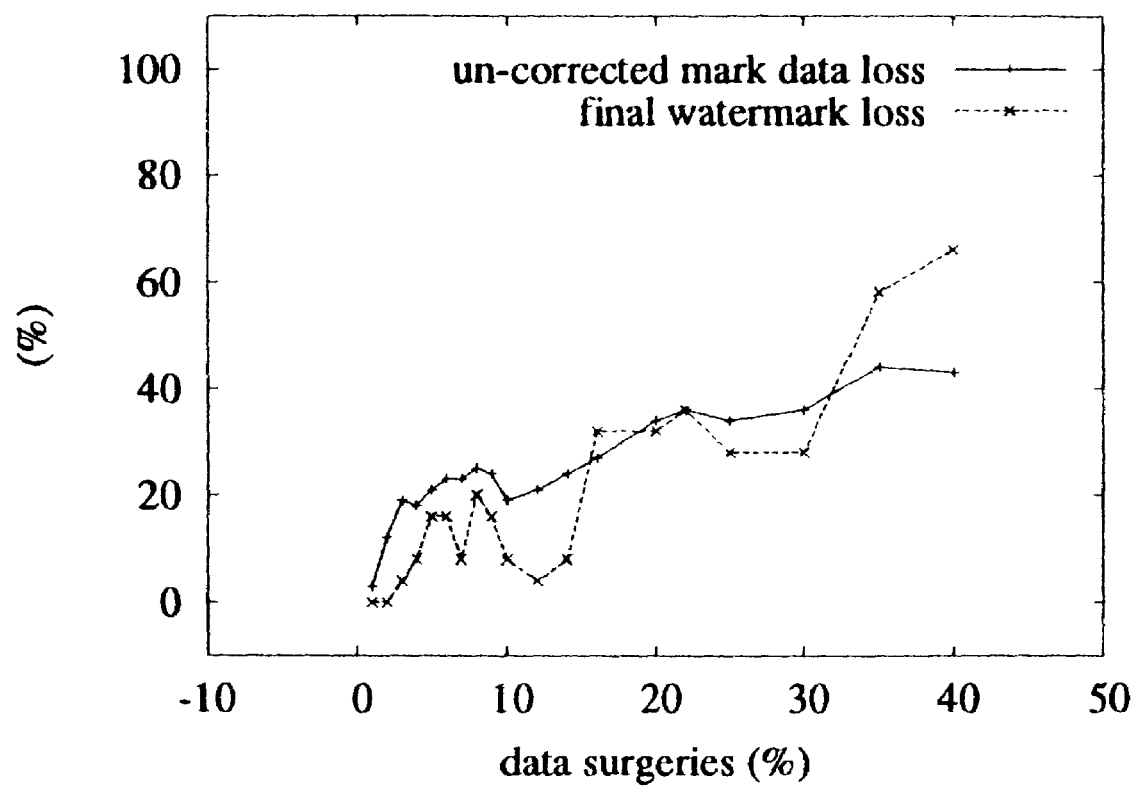
Figure 7C:
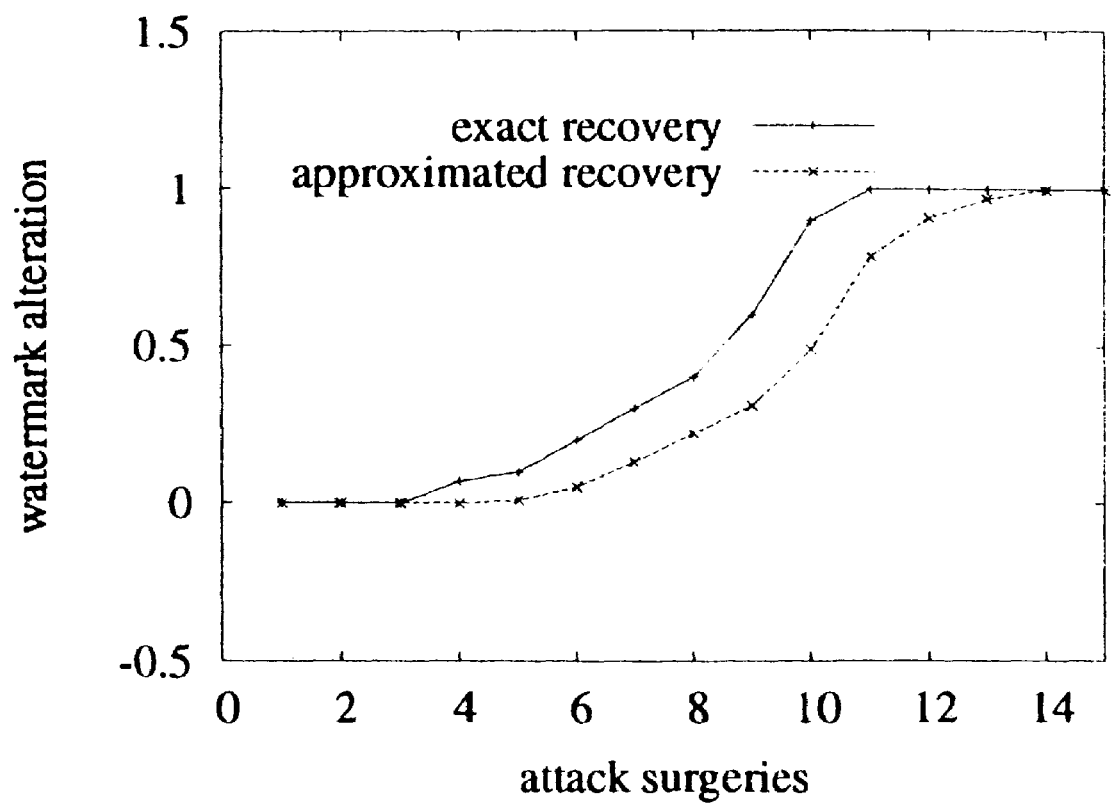

FIG. 7 illustrates the results of experiments on the resilience of one watermark to data loss attacks. The distortion of the watermark as the input data is subjected to gradually increasing levels of data loss was studied. FIG. 7(c) shows the analysis that was performed repeatedly for single bit encoding using the "confidence violators" encoding method outlined above. The results were averaged over multiple runs. The "confidence violators" primitive set encoding proves to be resilient to a considerable amount of randomly occurring uniformly distributed surgeries (i.e., item removals by an attacker, with no extra knowledge) before watermark alterations occur. However, even then, there exists the ability to "trace" or approximate the original watermark to a certain degree by trying to infer the original mark value from an invalid set.

The set size considered was 35 and experiments were performed on 30 different sets of close to normally distributed data. Other parameters included $v_{false}$=5%, $v_{true}$=9%, and c=88%. The average behavior is plotted. Up to 25% and above data loss was tolerated easily by the tested data, before mark alteration (i.e., bit-flip) occurred.

FIGS. 7(a) and 7(b) illustrate additional scenarios in which a multi-bit watermark is embedded into a larger data set (both (a) uniform and (b) normal distributions in FIG. 7 were considered). The input data contained 8,000 tuples, subset size was 30, and the considered watermark was 12 bits long. Other parameters included $V_{false}$=15%, $V_{true}$=35%, and c=85%. This set was subjected to various degrees of data loss and the watermark distortion was observed. The encoding method again proves to be surprisingly resilient by allowing up to 45-50% data loss while still 40-45% of the watermark survives. Also, in FIG. 7(a), as data alteration increases, the subset (i.e., secretly selected for encoding 1-bit) overlap or resemblance to the original content degrades.

EXAMPLE 2

In another example, the sensitivity of the watermarking scheme to randomly occurring changes, as a direct measure of watermark resilience, was analyzed. A transformation was defined that modifies a percentage of the input data within certain bounds defined by two variables and μ. This transformation is referred to an epsilon-attack. Epsilon attacks can model any uninformed, random alteration, the only available attack alternative.

A normal epsilon-attack modifies roughly $$\frac{t}{2}$$

percent of the input tuples by multiplication with (1+,μ+ϵ) and the other $$\frac{t}{2}$$

percent by multiplication with (1+μ+ϵ). A "uniform altering" epsilon-attack modifies τ percent of the input tuples by multiplication with a uniformly distributed value in the (1+μ−ϵ, 1+μ+ϵ) interval.

Figure 8:
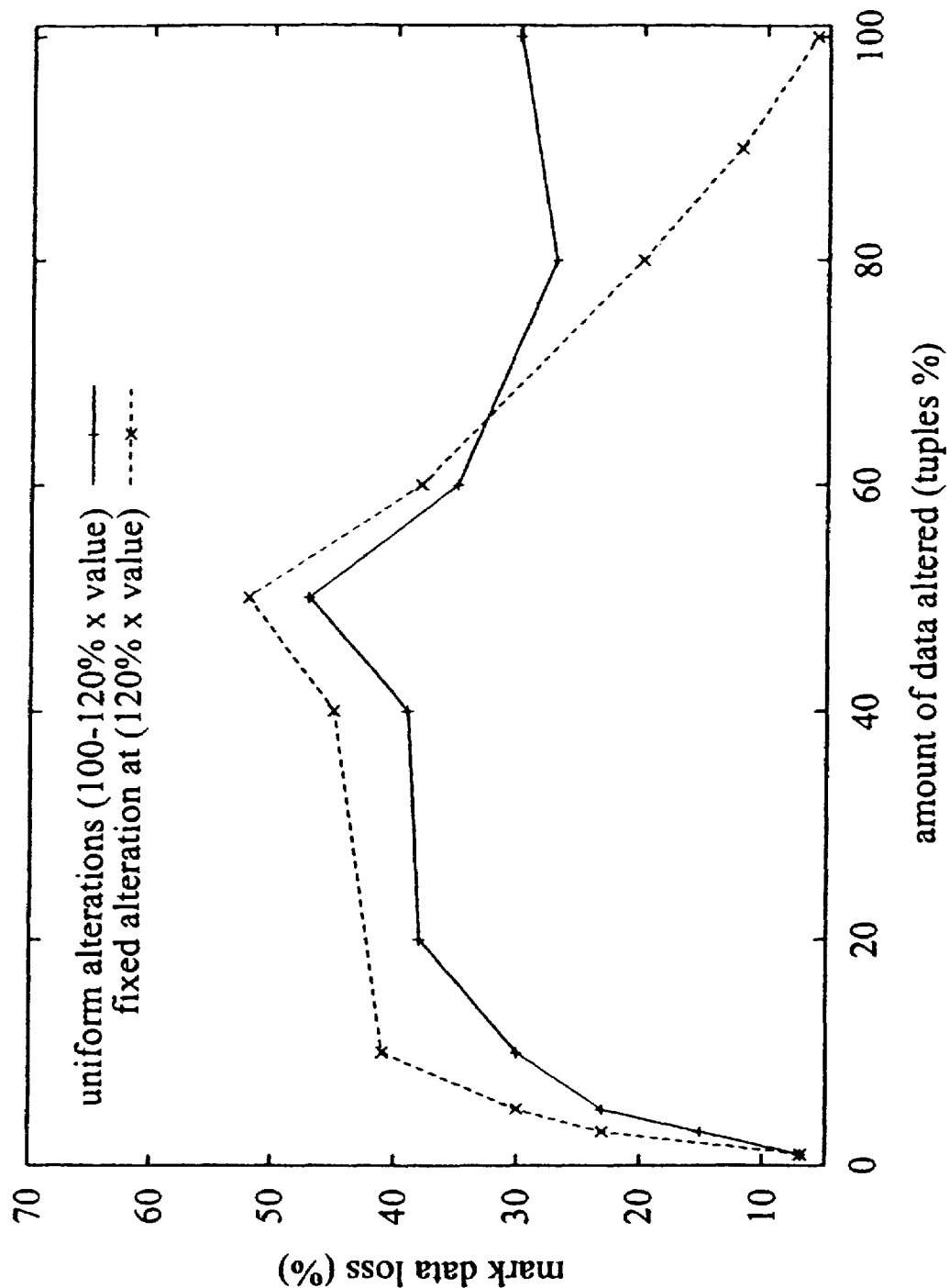
FIG. 8 is a depiction of the behavior of a watermarked item to an epsilon-attack (non-zero average) on a normally distributed data set.

FIG. 8 illustrates an epsilon-attack (non-zero average) on a normally distributed data set. A comparison is made between uniformly distributed (i.e., values are altered randomly between 100 and 120% of their original value) and fixed alterations (i.e., values are increased by exactly 20%). In the case of fixed alterations, the behavior demonstrates the effectiveness of the encoding convention. As more and more of the tuples are altered linearly, the data distribution becomes increasingly closer to the original shape. For example, when 100% of the data is modified consistently and linearly, the mark data suffers only 6% alterations.

A peak around 50% data alterations can be observed indicating that an attack changing roughly 50% of the data might have a greater chance of success. In the case of randomly distributed alterations, a maximal change in distribution is expected when close to half of the data set is skewed in the same "direction," by addition or subtraction.

Parameter μ models the average of the data alteration distribution while ϵ controls its width. A "zero-average" epsilon-attack (μ=0) is a transformation that modifies roughly $$\frac{\tau}{2}$$

percent of the input tuples by multiplication with (1+ϵ) and the other $$\frac{\tau}{2}$$

percent by multiplication with (1−ϵ).

EXAMPLE 3

FIG. 9 illustrates the behavior of one watermark to an epsilon-attack (zero-average) on a normally distributed data set. Since the bit encoding convention may rely upon altering the actual distribution of the data, it may survive any distribution-preserving transformation gracefully. Randomly changing the data, while it may damage the watermark (e.g., especially when altering around 50% of the data, as shown in FIG. 8), proves to be, to a certain extent, distribution preserving. A zero-average epsilon-attack is survived very well. For example, altering 80% of the input data within 20% of the original values still yields over 70% of the watermark.

Even if the watermark encoding relies heavily upon the distribution of the data, an attack that alters the distribution still will not be successful as the power of the watermarking scheme lies not only in the distribution itself but also in the secrecy of the encoding subsets. Therefore, where the bits are encoded (i.e., subsets) is as important as how. Altering global data characteristics would not only probably destroy much of the value of the data but, as shown above, achieve little in destroying the watermark.

Figure 9A:
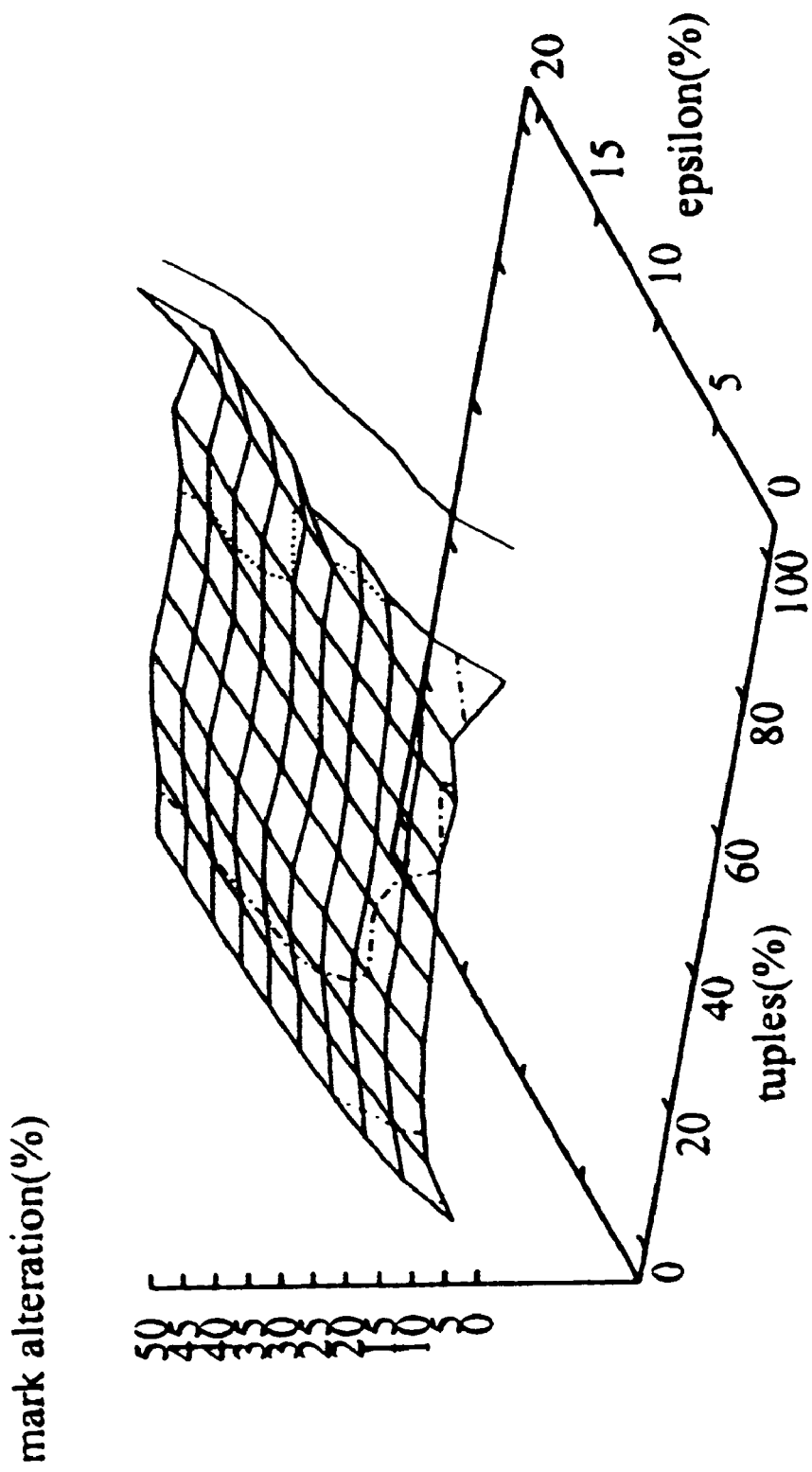
FIG. 9 is a depiction of the behavior of a watermarked item to an epsilon-attack (zero-average) on a normally distributed data set.
Figure 9B:
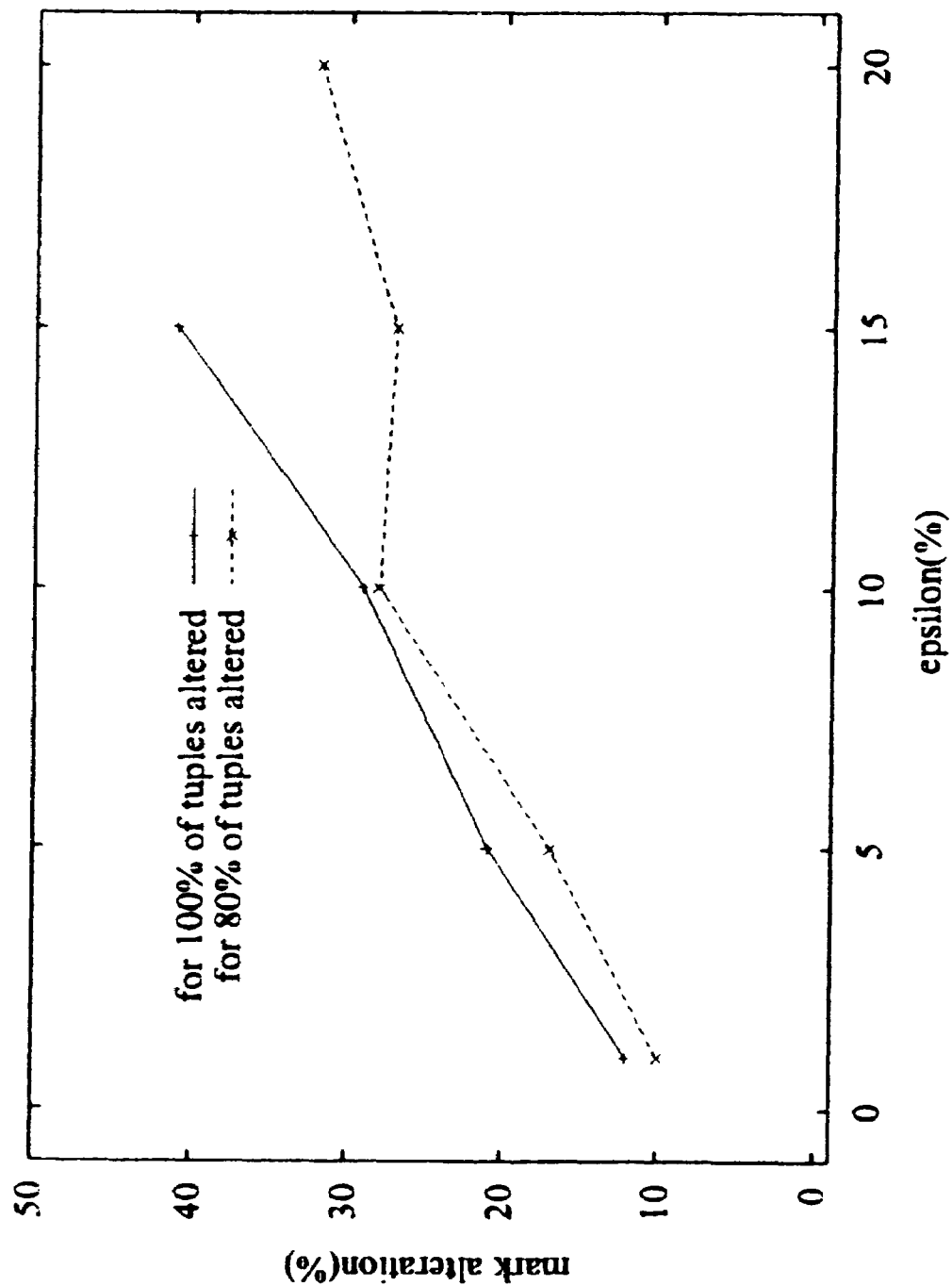
Figure 9C:
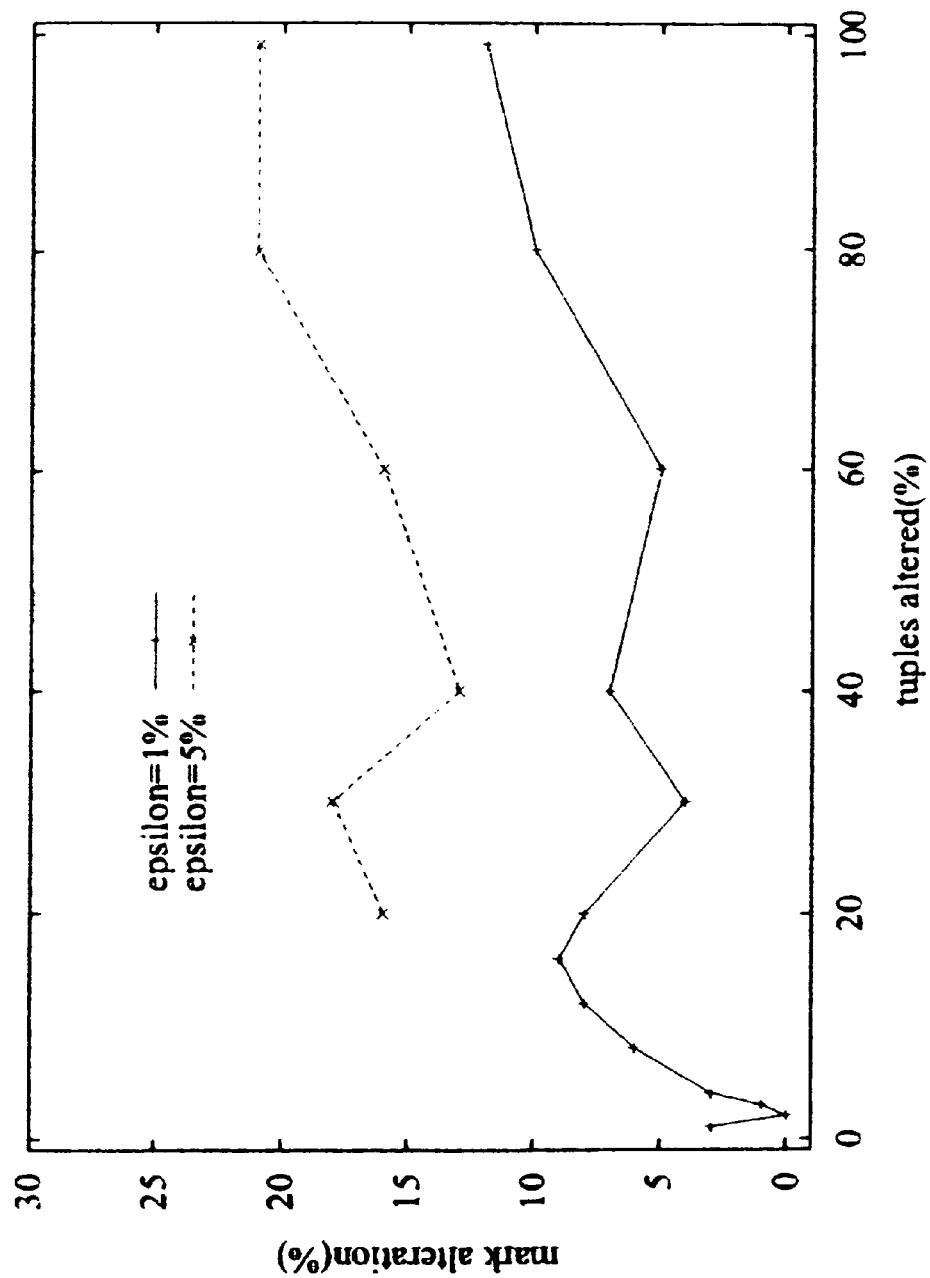

FIG. 9(a) shows that as the percentage of tuples altered and alteration factor increase, so does the watermark distortion. Nevertheless, the watermark turns out to be surprisingly resilient. For example, altering 100% of the data within 1% of the original values can yield a distortion as low as 1-3% in the resulting watermark. The watermark distortion increases with increasing (b) alteration factor or (c) percentage of data. FIG. 9(b) presents a comparison between the curves corresponding to the alteration of 80% of the tuples versus 100% of the tuples. The curve for the higher tuples percentage appears "above." In FIG. 9(c), a comparison is made between curves for the alteration factor 1% or 5%. The higher alteration curve is "above." The curves are slightly increasing but not very steep because mark alteration is less dependent upon the percentage of data altered than on the alteration factor, as shown in FIG. 9(b). Thus, the watermarking scheme provides resilience to uninformed attacks, as modeled by epsilon-attack transformations.

The system may utilize data quality or goodness metrics. The impact of data goodness preservation on the available watermark encoding bandwidth was analyzed. The more restrictive the data constraints imposed are, the less available bandwidth there is, as allowable data changes are directly impacted. One of the analyzed goodness metrics was the upper bounds imposed upon the total and local tolerable absolute change (i.e., of the new data with respect to the original). A practically identical experimental result was obtained for a related metric, the maximum allowable mean squared error.

EXAMPLE 4

Figure 10:
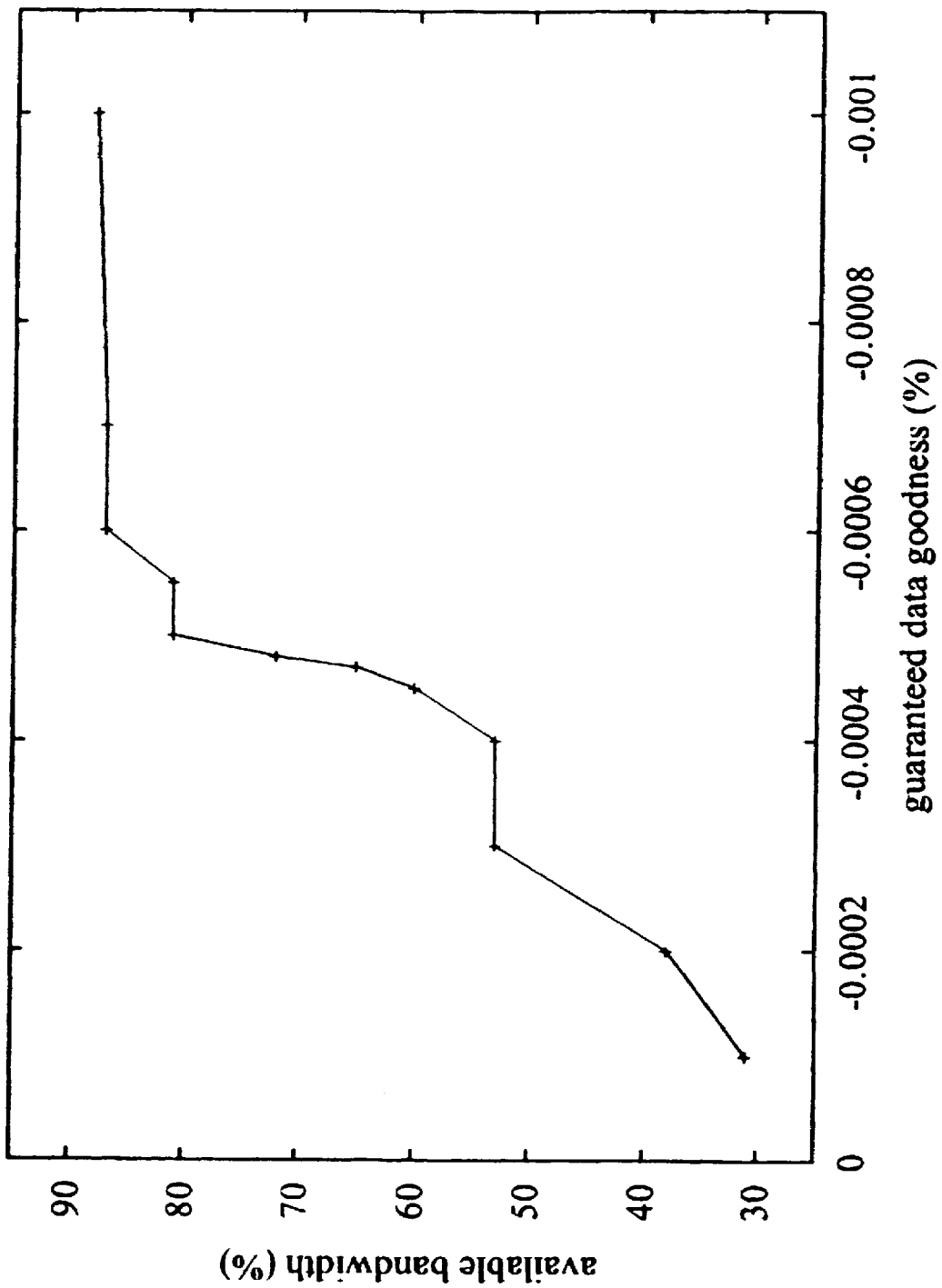
FIG. 10 is a depiction of the impact of the maximum allowable absolute change goodness metric upon the available watermarking bandwidth.

FIG. 10 illustrates the impact of the maximum allowable absolute change goodness metric upon the available watermarking bandwidth of one watermark. As data goodness metrics become increasingly restrictive, the available bandwidth (guaranteeing higher resilience) decreases. In the illustrated experiment, the allowed absolute change in the watermarked data is decreased gradually from 0.1 to 0.02% and the decrease in available encoding bandwidth is observed (depicted as a percent of total potential bandwidth). The upper limit (approximately 90%) is inherently data imposed and cannot be exceeded due to original data characteristics, making it effectively the maximum attainable bandwidth.

A classification preserving data goodness metric was also analyzed. Classification preservation deals with the problem of propagation of the classes occurring in the original input data in the watermarked output version of the data. Thus, it provides the assurance that the watermarked version still contains most, or within a certain allowed percentage, of the original classes.

To analyze the classification preservation performance of the system, a data classifier was designed which allows for runtime fine-tuning of several important classification parameters, such as the number of classes to be associated with a certain data set, as well as the sensitivity of these classes. The sensitivity parameter may be illustrated best by example. Given a certain data set to be altered or watermarked and an item X in this data set, the classification sensitivity models the amount of alterations X tolerates before it "jumps" out of its original class. A different perspective on sensitivity may be obtained by linking it to the notion of classification selectivity. The more selective a classification is, the more sensitive it behaves.

EXAMPLE 5

Figure 11A:
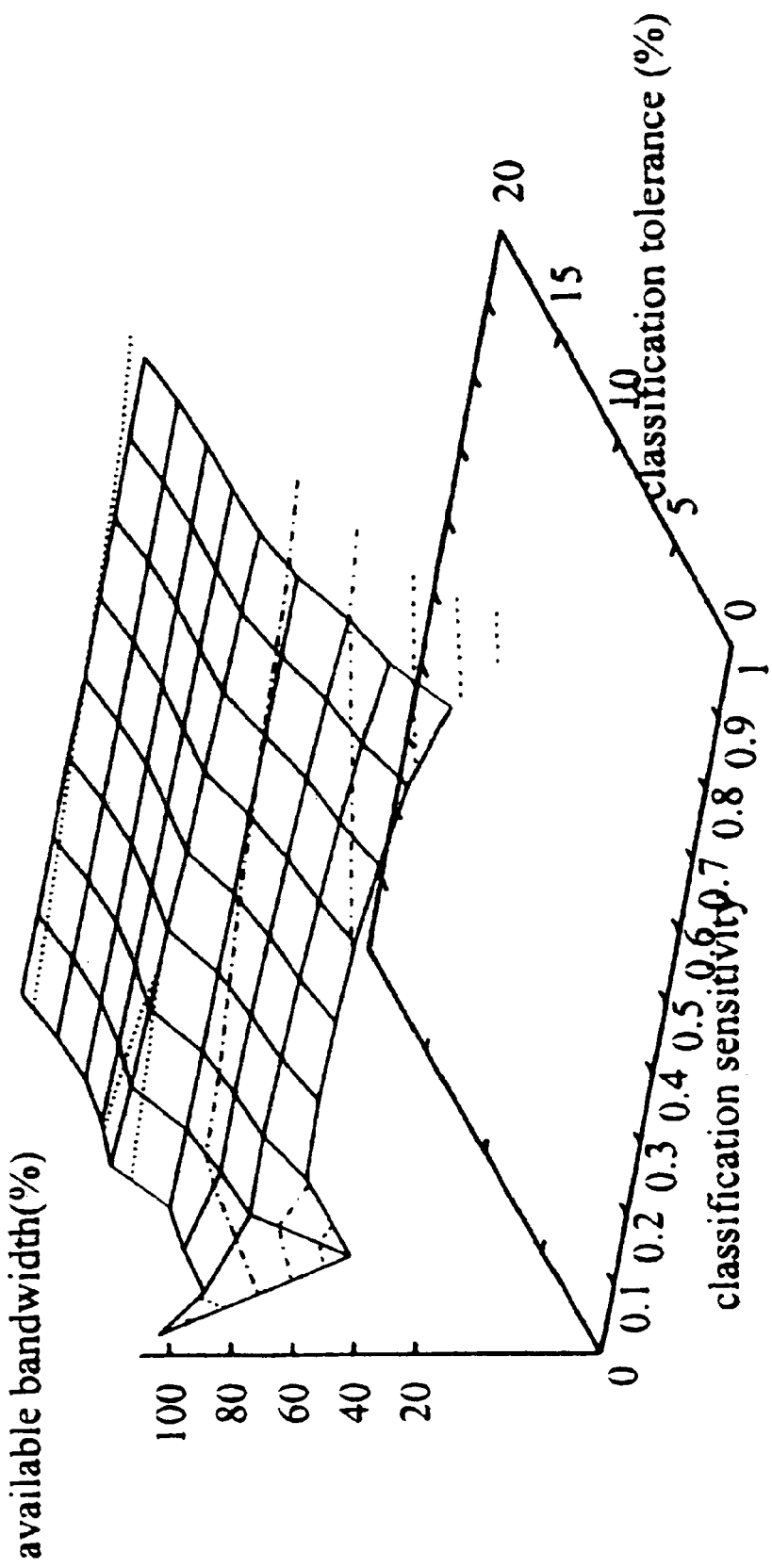
FIG. 11 is a depiction of the impact of a classification preserving goodness metric upon the available watermarking bandwidth.
Figure 11B:
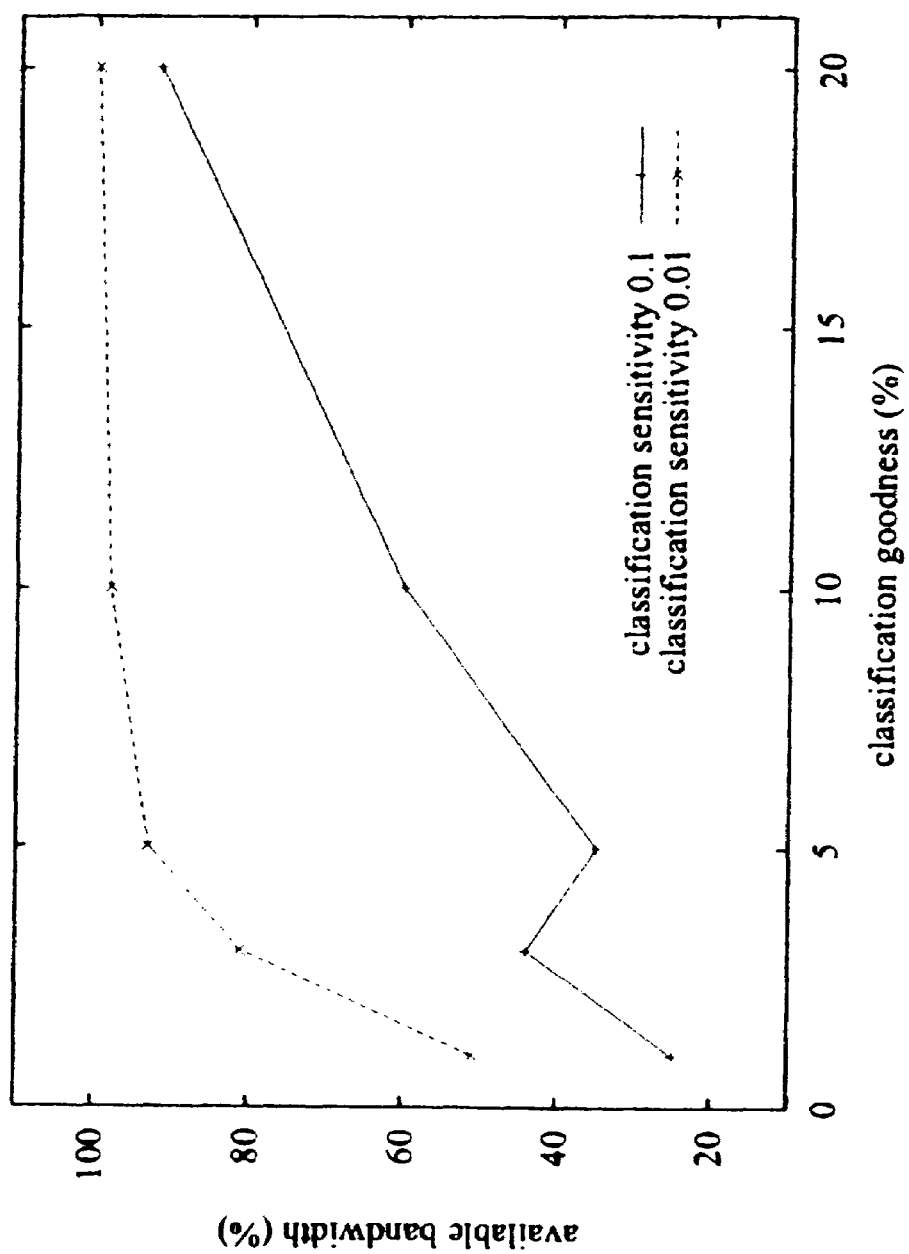
Figure 11C:
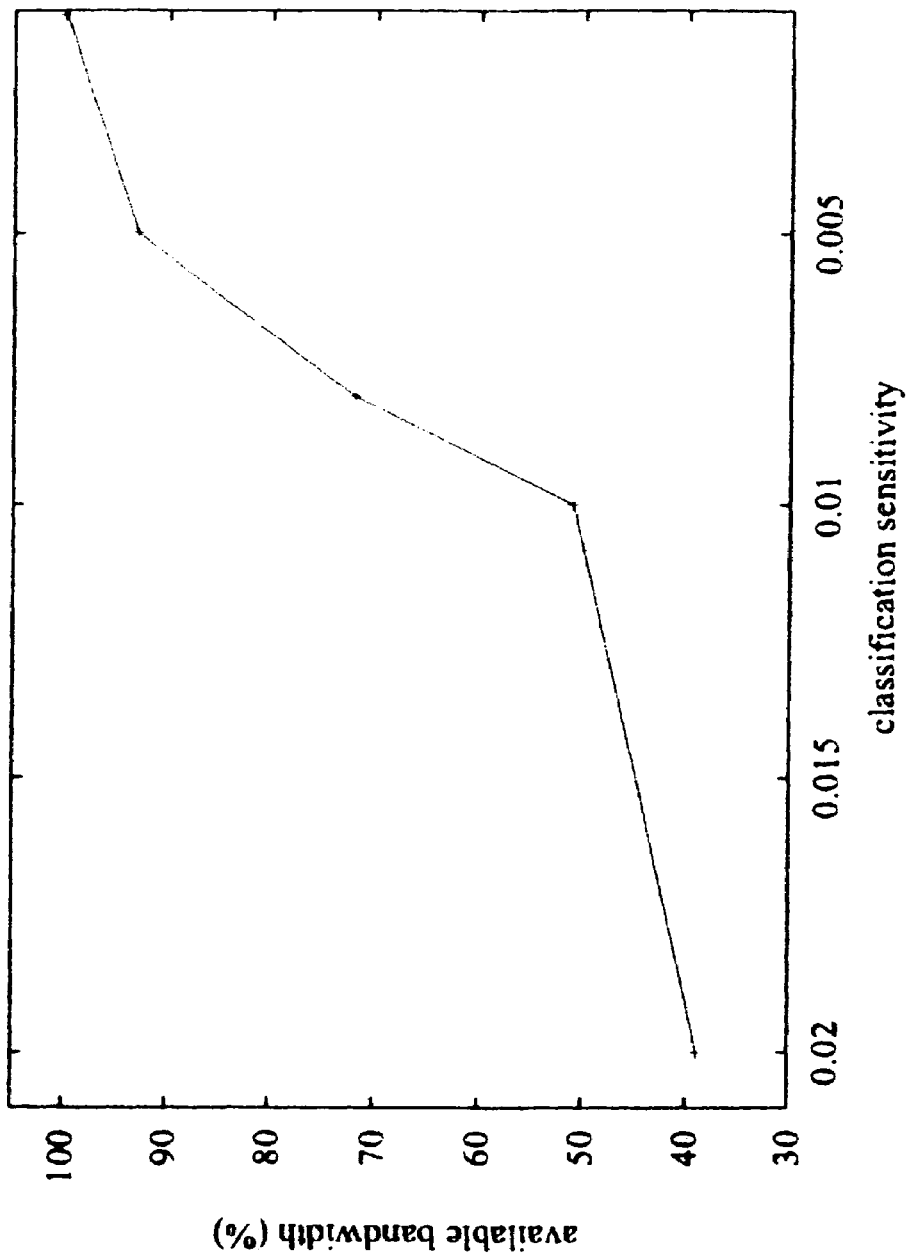

FIG. 11 illustrates the impact of a classification preserving goodness metric upon the available watermarking bandwidth. The tolerance factor in FIG. 11 represents the maximum tolerated classification distortion (i.e., the percentage of class violators with respect to the original). FIG. 11(a) shows that as the classification tolerance and sensitivity increase, so does the available bandwidth. FIG. 11(b) shows how the watermarking algorithm adapts to an increasing data goodness tolerance (classification sensitivity 0.01). FIG. 11(c) depicts how, for a classification tolerance fixed at 1%, the sensitivity of the classification impacts the available bandwidth directly. Depending upon classification sensitivity (e.g., 0.01 in FIG. 11(b)), up to 90% of the underlying bandwidth may become available for watermark encoding with a restrictive 6% classification preservation goodness.

Thus, as classification tolerance is increased, the application adapts and makes use of an increased available bandwidth for watermark encoding. Further, classification preservation is compatible with the distribution-based encoding method discussed above, an important point to be made, considering the wide range of data-mining applications that could naturally benefit from watermarking ability.

As watermarking is most likely to be a performed only once per transaction, usually at outsourcing time, computation overhead is normally not an issue (unless exorbitantly time-consuming). Nevertheless, computation times were assessed and a linear behavior was observed, directly proportional with the input data size. Given the setup described above, in single-user mode, with a local database, an average of around 150-200 tuples per second for watermark embedding was obtained, while detection turned out to be approximately twice as fast. The results considered the case of no data goodness metrics, thus measuring the core performance of the system (goodness metric evaluation is mostly user and data dependent).

EXAMPLE 6

By way of another another example, the watermark considered to be hidden was the string "(C)walmart" (80 bits in 8 bit/character encoding). Algorithm parameters were adjusted repeatedly in an attempt to maximize the number of embedded copies, finally establishing the parameters as c=85%, $v_{false}$=15%, and $v_{true}$=30%.

The attributes watermarked were (1) IS.TotalScanAmount, (2) IS.UnitCostAmount, (3) SV.TenderAmt, (4) SV.TotalVisitAmt, and (5) SV.SalesTaxAmt, where "StoreVisits" and "ItemScan" have been abbreviated by "SV" and "IS," respectively. An example of the size of the subsets considered was roughly 70 for a total of around 2,000 available encoding bits in the TotalScanAmount attribute. A set of usability metrics and associated queries was considered, including the following:
  (a) Intra-relational Consistency: IS.UnitCostAmount×
    IS.ItemQuantity−IS.TotalScanAmount
  (b) Inter-relational Consistency: SV.TotalVisitAmt<SUM
    (IS.TotalScanAmount)
  (c) General Attribute Constraints: MSE constraints for
    attribute SV.TotalVisitAmt and the normalized mean
    squared error should not exceed 1~Tc.
  (d) General SQL Constraints: e.g., (d.1) for each store and
    date, the number of sales after watermarking should not
    deviate more that 2% from the original data, (d.2) for the
    join between SV and IS on the VisitNbr attribute, a
    maximum number of 5% of the elements should be
    disturbed after watermarking.

For example, the actual numeric value in (d.2) can be formulated as follows:
SELECT*AS J1 FROM ItemScanOrig, StoreVisitsOrig
WHERE
  ItemScanOrig.VisitNbr=StoreVisitsOrig.VisitNbr;
SELECT*AS J1 FROM ItemScanWM, StoreVisitsWM
WHERE
  ItemScanWM.VisitNbr=StoreVisitsWM.VisitNbr;
SELECT COUNT(*) FROM
  (SELECT*FROM J1 EXCEPT SELECT*FROM J2)
  UNION
  (SELECT*FROM J2 EXCEPT SELECT*FROM J1))

In the working system, each of these metrics was presented by a separate usability metric plug-in, used in evaluating data usability after each atomic watermarking step. For example, the usability metric module for (d.2) executes the above query and if the result exceeds a certain threshold, it simply returns false, denying the watermarking module the proposed modifications to the data. The watermarking module may then perform a rollback on those modifications and continues on to the next subset.

Some of the usability constraints above present a set of deployment challenges especially when implemented as usability plug-in modules. For example, step(c) presented the need for maintaining original reference data in order to be able to compute RISE values. This was overcome by creating an additional relation at run-time, used by the plug-in to keep original data that was altered in the watermarked version. Additionally, step (d.2) requires comparing JOINS on the original data to joins on the resulting data. Two approaches were tried. In the first approach, the entire original data was duplicated temporarily and JOINS were dynamically performed at run-time. However, this approach is computation-intensive, often causing JDBC buffer related crashes and requiring long execution times. The second approach kept a record of watermark-related alterations and then directly assessing their impact in the data JOIN result (i.e., determining whether a change in tuple X in table SV will affect a yet unaccessed tuple in the JOIN result with table IS). The second approach, requiring definitely less memory and computational power, works well.

Using the attribute IS.TotalScanAmount, the watermark was embedded successfully approximately 21 times, leading to a good utilization (84%) of the potential encoding bandwidth of 2,000 bits. This provides a highly accurate final majority voting step during mark detection and retrieval time.

The system watermarks digital data by (1) providing a new suitable mark encoding method for numeric sets and (2) building an algorithmic secure mapping (i.e., mark amplification) from a simple encoding method to a more complex watermarking algorithm. The embedded watermark may survive 50% and above of original data loss.

Building upon the framework provided by the systems and methods directed to watermarking numeric data sets, other aspects are specifically directed toward watermarking categorical relational data. Again, the data quality is fully preserved and the watermark survives important attacks. Mark detection is fully blind in that it doesn't require the original data. For example, the categorical relational data watermark may survive up to 80% data loss with an alteration of only 25%.

Further, the data schema utilized may include a set of discrete attributes $\{A, B\}$ and a primary data key K, that is not necessarily discrete. Any attribute X in $\{A, B\}$ may yield a value out of $n_x$ possibilities (e.g., city names, airline names). Hence, the schema may be (K, A, B).

Additionally, the number of tuples in the database may be defined as N. By notation, for any entity X (e.g., relation attribute), b(X) is the number of bits required for its representation and msb(X, b) the most significant b bits. If b(X)<b, X may be left-padded with (b−b(X)) zeroes to form a b-bit result. For any categorical attribute X, $b(n_x)$<b(X). $T_j(X)$ may be defined as the value of attribute X in tuple j and $\{a_1, \ldots, a_{nA}\}$ as the discrete values of attribute A, which are distinct and may be sorted, for example, by ASCII value. The normalized (to 1.0) occurrence frequency of value $a_j$ in attribute A may be defined as $f_A(a_j)$. $f_A(a_j)$ may model the defacto occurrence probability of value $a_j$ in attribute A. wm may be a |wm|-bit watermark to be embedded, wm[i] the $i^{th}$ bit of wm. In any of the following mathematical expressions, the symbol "&" signifies a bit-AND operation. Also, set_bit(d, a, b) may be a subroutine that returns d with the bit position a set to value b.

A special defacto secure construct in the form of a one-way cryptographic hash may be employed. crypto_hash( ) is a cryptographic secure one-way hash which relies upon the assumption that it is computationally unfeasible for a given value V' to find a V such that crypto_hash(V)=V'. The assumption of one-wayness lies at the heart of many current security protocols. Examples of potential candidates for crypto_hash( ) are the MD5 or SHA hash. For notational purposes, H(V, k)=crypto_hash(k; V, k) (where ";" denotes concatenation).

Defenses from attacks on categorical relational data may include those that are applicable to numeric relational data. Additionally, for immunity against horizontal data partitioning, the watermark has to be embedded within the overall data properties that survive subset selection. If the assumption is made that the attack alterations do not destroy the value of the data, then subset alteration should be defeated by embedding the primitive mark within resilient global data properties.

As previously mentioned, by its very nature, watermarking modifies its input. If data constraints on the input/output relationship are too restrictive, watermarking could potentially fail due to the lack of bandwidth. Additionally, while it is necessary that the intended purpose of the data should be identified and preserved during the watermarking process, sometimes this may not be possible.

The extreme case occurs when any alterations are allowed to the data. In this situation, the available bandwidth is directly related to the data entropy. As this requirement becomes increasingly restrictive, the watermark necessarily becomes more vulnerable. The available bandwidth often may be expressed as an increasing function of allowed alterations.

The discrete nature of the data domain results in an inherent limitation in the associated entropy. In order to enable watermarking, one method first identifies appropriate embedding channels. After which, new encoding methods are able to leverage the newly discovered bandwidth.

Accordingly, one of the initial steps may be to establish appropriate bandwidth channels. Unfortunately, if the discrete attribute A has a finite set of possible values ($n_A$), unless this value is really high, the associated $\log2(n_A)$ bits entropy is not going to be enough for direct domain embedding of a reasonable watermark length/convince-ability. For example, in the case of departure cities, a value of $n_A$=16,000 yields only 14 bits.

However, in the case of categorical data there exists a natural, solid semantic association between A, the rest of the schema's categorical attributes (e.g., B) and the data's primary key K. This association derives from the fact that in most cases no concept of "minor" changes exists. Any change is going to necessarily be significant, such as a change in the departure city from "Chicago" to "San Jose." A comparatively large potential encoding bandwidth may be found in these associations between categorical attributes, including possibly the primary key. This bandwidth may be utilized in the embedding algorithm.

Additionally, while direct domain embedding does not seem to have enough entropy potential, a related dimension, the value occurrence frequency-transform (attribute frequency histogram), may be leveraged as an additional, or alternate, encoding channel.

Further, an algorithm may be embedded that is able to resiliently hide information within the attribute association outlined above, while preserving guaranteed data distortion bounds, and subsequently, if necessary, augmenting it with a direct-domain watermark.

Surviving vertical partitioning attacks is important for watermarks and requires a careful consideration of the attribute association used in the embedding process. The system may utilize an initial user-level assessment step in which a set of attributes are selected that are likely to survive vertical partitioning attacks. In the extreme case (i) just one attribute and the primary key are going to survive. A milder alternative (ii) assumes that more than one categorical attributes and the primary key survive the partitioning process.

FIG. 12 illustrates an embedding algorithm. At mark encoding time, a relation with at least a categorical type attribute A to be watermarked, a watermark wm and a set of secret keys ($k_1$, $k_2$) and other parameters (e.g., e) used in the embedding process may be used as input. The algorithm starts by discovering a set of "fit" tuples determined directly by the association between A and the primary relation key K. These tuples are considered for mark encoding.

A tuple $T_i$ may be "fit" for encoding if $H(T_i(K),k_1)$ mod $e=0$, where e is an adjustable encoding parameter determining the percentage of considered tuples, the set of fit tuples may contain roughly $$\frac{N}{e}$$

elements and the parameter e may be controlled at embedding time to adjust the trade-off between the level of data alteration and mark resilience, and $k_1$ may be a secret max(b(N), b(A))-bit key. A tuple may be considered "fit" if its primary key attribute satisfies a certain secret criteria.

The available embedding bandwidth $$\frac{N}{e}$$

may be greater than the watermark bit-size |wm|. Accordingly, an error correcting code (ECC) may be employed that, upon embedding, receives a desired watermark wm as input and produces as output a string of bits wm_data of length $$\frac{N}{e}$$

containing a redundant encoding of the watermark, tolerating a certain amount of bit-loss, wm_data =ECC.encode(wm, $$\text{wm\_data} = ECC.encode\left(w, m\frac{N}{e}\right).$$

At decoding time, the ECC may receive a potentially altered wm_data as input and produce the most likely corresponding wm, wm=ECC.decode(wm_data, |wm|). Numerous error correcting codes may be utilized successfully within the present invention. In one aspect, majority voting was employed. wm_data[i] may be defined as the $i^{th}$ bit of wm_data. Thus, in one aspect, the error correcting code may be deployed before embedding to compute the bits that are to be embedded wm_data=ECC.encode(wm, $$\text{wm\_data} = ECC.encode\left(w, m\frac{N}{e}\right).$$

For each "fit" tuple $T_i$, one bit may be encoded by altering $T_i(A)$ to become $T_i(A)=a_t$ where $$t = \text{set\_bit}\left(msb(H(T_i(K), k_1), b(n_A)), 0, \text{wm\_data}\left[msb\left(H(T_i(K), k_2), b\left(\frac{N}{e}\right)\right)\right]\right),$$

where $k_2$ is a secret key $k_2 \neq k_1$. Hence, a secret value of $b(n_A)$ bits, depending upon the primary key and $k_1$, may be generated and then the least significant bit may be forced to a value according to a corresponding (random, depending upon the primary key and $k_2$) position in wm_data.

Utilization of a second different key ensures that there is no correlation between the tuples selected by $k_1$ for embedding and the corresponding bit value positions in wm_data selected by $k_2$. Such a correlation may potentially cause certain bits to be never considered in the embedding process. Thus, the new attribute value may be selected by the secret key $k_1$, the associated relational primary key value, and a corresponding bit from the watermark data wm_data.

The "fitness" selection step provides several advantages. On the one hand, secrecy and resilience are ensured and on the other, it effectively "modulates" the watermark encoding process to the actual attribute-primary key association. Additionally, the cryptographic safety of the hash one-wayness may be leveraged to defeat any allegations that the data in dispute is not actually watermarked but that rather certain values for $k_1$ and $k_2$ were searched for to yield the watermark.

When computing t (i.e., selecting a new value for $T_i(A)$) there may be a few cases when the same wm_data bit is selected to embed. The pseudorandom nature of $H(T_i(K),k_2)$ guarantees on average that a large majority of the bits in wm_data are going to be embedded at least once. The ulterior step of error correction may tolerate such small changes.

While it does a good job during watermark embedding, data alteration is an expensive operation because it effectively destroys valuable data. However, other data transformations also may be made use of, each with a different degree of associated data distortion and benefits.

FIG. 13 illustrates a watermark decoding algorithm. The potentially watermarked data and the secret keys $k_1$, $k_2$ and e may be assumed as input. The same criteria as discussed above for discovering "fit" tuples may then used. That is, a tuple $T_i$ may be "fit" for encoding if $H(T_i(K), k_1)$ mod $e=0$.

One of the original steps of the decoding algorithm is to discover the embedded wm_data bit string. For each "fit" tuple $$T_i, \text{ with } T_i(A) = a_t, \text{wm\_data} \left[msb\left(H(T_j(K), k_2), b\left(\frac{N}{e}\right)\right)\right] = t \,\&\, 1.$$

Once the possibly altered wm_data is available, error correction may be invoked to generate the most likely corresponding watermark wm, wm=ECC.decode(wm_data, |wm|).

FIGS. 12 and 13 together also illustrate alternate encoding and decoding algorithms using an embedding map. The on-the-fly hash-table/mapping may be maintained with $$\left(\frac{N}{e}\right)$$

entries between $T_i(K)$ values and the actual considered bit index in wm_data. The mapping may be used at detection time to accurately detect all wm_data bits. The extra watermark bit selection key ($k_2$) may or may not be employed by the on-the-fly algorithm.

The advantage of using $H(T_i(K), k_2)$ in selecting the wm_data bit to embed becomes clear in the context of data loss alterations. Because the selected bit is directly related only to the currently considered tuple, this method survives subset selection and data addition attacks.

The algorithm may be extended to provide more generality and resilience, in particular to vertical data partition attacks. An attacker may partition the data in such a way as to preserve only two attributes and no primary key. Moreover, if one of the remaining attributes can act as a primary key, the partitioning results in no duplicates-related data loss (in the two attributes).

However, instead of relying upon the association between the primary key and A, the algorithm may be extended to consider all pairs of attributes and may embed a watermark separately in each of these associations. Thus, if the original watermarking method read mark(K, A) for a schema composed of the primary key K and A, in the case of a (K, A, B) schema the watermark may be applied several times, for example mark(K, A), mark(K, B), and mark(A, B). In each case, one of the attributes may be treated as a primary key, while maintaining the rest of the algorithm in place. This provides protection against vertical data partition attacks and allows for more resilience in the rest of the scenarios. In addition, this effectively "breaks" the previous algorithm's dependency upon the primary key.

Interference may arise as an issue. If both the pair (K, A) and the pair (K, B) are watermarked, everything may operate correctly as long the modified attributes A, B are different. With the exception of semantic consistency issues that would need to be handled, the two encodings seem to be independent. But in the case of additionally watermarking the pair (A, B), modifying B suddenly interferes with the modifications that occurred in the (K, B) case.

Although the level of interference is likely to be very low (as the probability of the same tuple to be considered again in the second encoding is low, especially in large data sets), there exists a solution to this problem. Maintaining a hash-map at watermarking time, which remembers the modified tuples in each marking pass, allows the algorithm to be extended to avoid tuples and/or values that were already considered.

Additionally, when considering the association between two attributes A, B as an encoding channel for a watermark, if values in B were already altered during a previous encoding, instead of deploying mark(A, B) (which would result in further alterations to B), the mark(B, A) may be utilized. While still encoding the mark in the association between A and B, by modifying currently unmodified A the watermark may be effectively spread throughout the entire data, increasing its level of resilience. Moreover, data constraints permitting, it may be possible to watermark each and every attribute pair by first building a closure for the set of attribute pairs over the entire schema which may minimize the number of encoding interferences while maximizing the number of pairs watermarked.

While most vertical partitioning attacks may be handled by a multiple attribute embedding solution, consider an extreme vertical partitioning attack scenario in which the attacker only preserves a single categorical attribute A.

An intuitive assumption is that $n_A$, the number of possible values in A, is much smaller than N, thus A by itself contains many duplicate values. Because there is probably very little value associated with knowing the set of possible values of $\{a_1, \ldots a_{n_A}\}$, the main value of A, from the attacker's viewpoint, is arguably to be found in one of the only remaining characteristic properties, namely the value occurrence frequency distribution $[f_A(a_i)]_{i \in (1, n_A)}$. An alternative watermark encoding method for this set may survive an extreme partitioning attack and be able to associate rights to this aspect of the data.

The system may embed a watermark in the occurrence frequency distribution domain by utilizing the watermarking method for numeric sets that is able to minimize the absolute data alteration in terms of distance from the original data set, as discussed above. In the categorical domain, the primary concern is usually minimizing the number of data items altered, whereas in the numeric domain, the goal is to minimize the absolute data change. Because $\lfloor f_A(a_i) \rfloor_{i \in (1, n_A)}$ are values modeling occurrence frequency, a solution minimizing absolute data change in this frequency domain minimizes the number of items changed in the categorical value domain. Additionally, issues regarding mark interference with other encodings may be solved by an approach similar to using embedding markers.

The categorical relational watermarking method may be blind, in that it doesn't require the original data in the detection process. This is important because it is unrealistic to assume that the original data is available after any length of time has elapsed, especially in the case of massive data sets. Also, the method may support incremental updates. As updates occur to the data, the resulting tuples may be evaluated on the fly for "fitness" and watermarked accordingly.

The categorical relational data watermarking method of the present invention was analyzed to assess its attack vulnerability. The probability of a given watermark of length |wm| to be detected in a random data set of size N was determined. The assumption was that $$|wm| < \frac{N}{e}$$

(enough bandwidth). This probability is easily established as $$\left(\frac{1}{2}\right)^{|wm|}.$$

In case multiple embeddings are used, such as with majority voting, and all of the available bits are utilized, this probability decreases even more to $$\left(\frac{1}{2}\right)^{\frac{N}{e}}.$$

For example, in the case of a data set with N=6000 tuples and with e=60, this probability is approximately $7.8 \times 10^{-31}$.

The categorical relational data watermarking method of was analyzed to assess its vulnerability to data alteration attacks. If an attacker randomly alters a total number of a data tuples and succeeds in each case to flip the embedded watermark bit with a success rate p, the probability P(r, a) of success of altering at least r, r<a watermark bits in the result should be analyzed. It can be established that $$P(r, a) = \sum_{i=r}^{a} [aCi] x p^a x (1-p)^{a-1}.$$

Only every $e^{th}$ tuple on average is watermarked. Hence, an attacker effectively attacks only an average of $$\frac{a}{e}$$

tuples actually watermarked. If $$r > \frac{a}{e} \text{ then } P(r, a) = 0.$$

On the other hand, $$\text{if } r > \frac{a}{e}, \text{ then } P(r, a) = \sum_{i=r}^{(\frac{q}{e})} C_i^{\frac{a}{e}} x p^{\frac{a}{e}-i} \quad (1)$$

Consider r=15, p=70% (it is quite likely that when an attacker alters a watermarked tuple, the embedded bit will be destroyed), a=1,200 (20% of the tuples are altered by the attacker (this is a unlikely attack used for illustrative purposes as an attacker cannot afford to destroy the data beyond use), |wm|=10 and e=60(|wm_data|=100).

This yields an effectively binomial distribution experiment with $X_i=1$, with probability p and $X_i=0$, with probability 1-p. $E[X_i]=p$, $var(X_i)=E[X_i^2]-(E[X_i])^2=\ldots=p\times(1-p)$ and by using the central limit theorem, it may be established that $$f(\Sigma X_i) = \frac{\Sigma X_i - \frac{a}{e} x p}{\sqrt{\frac{a}{e} x p x (1-p)}} \quad (2)$$

where $f(\Sigma X_i)$ effectively behaves like a normal distribution N(0,1) (when $$\frac{a}{e} x p \geq 5 \text{ and } \frac{a}{e} x (1-p) \geq 5).$$

The probability that $(\Sigma X_i) > r$ (an attack altering at least r bits) can be rewritten as the probability of $f(X_i) > f(r)$. This probability may be estimated by a normal distribution table lookup because of the normal behavior f(x) is known from that of f(r). The estimated probability P(15,1200)≈31.6%.

Assuming that the error correcting code can tolerate an average of $t_{ecc}$=5% alterations to the underlying data and that the alteration propagation is uniform and stable (if one bit in wm_data is altered above the $t_{ecc}$ bound then a stable average of $$\frac{|wm|}{|wm\_data|}$$

are altered in the resulting error corrected watermark wm=ECC.decode(wm_data, |wm|)) then the final watermark is going to incur only an average fraction of $$\left(\frac{\frac{r}{N}-t_{ecc}}{e}\right) \times \frac{|wm|}{|wm\_data|}$$

alterations. In the present situation, this is only 1.0%, corresponding to an average of 1.0 bit in the watermark. Therefore, in order to modify one bit in the watermark an attacker has to alter at least 20% of the data and even then has only a success rate of 31.6%. Furthermore, this above analysis was done in a scenario highly favorable to attack in which error correction could only handle 5% alterations in wm_data.

As data alteration is expensive, one goal is to minimize the number of altered tuples during the watermarking process. Attack vulnerability was defined as the probability $P(r, a)_1$ of success in altering one bit in the final watermark (wm) and the number of altered tuples was defined by the ratio $$\frac{N}{e}.$$

As such, the relationship between the required number of fit tuple encodings (i.e., available bandwidth) and attack vulnerability may be determined. Thus, the minimum number of alterations performed during the watermarking phase that would guarantee a certain upper bound on the overall attack vulnerability may be established. While this relationship is somewhat defined by equation (1), an actual estimate was sought.

Assuming an attacker cannot afford to modify more than 10% of the data items (a=600) and defining a maximum tolerable threshold τ=10% for $P(r, a)_1 (P(r, a)_1 < \tau)$, the minimum required e to guarantee these bounds may be computed (the other values are as above). By using equation (2) and doing a normal distribution table lookup, it may be derived that for τ=10%, e needs to satisfy $$\frac{r-\frac{a}{e}\times p}{\sqrt{\frac{a}{e}\times p \times (1-p)}} = 1.28,$$

which results in e≈23. Thus, only about 4.3% of the data needs to be altered to guarantee these bounds.

The system also may address bijective attribute remapping. An attack may remap the categorical attribute A through a bijective function to a new data domain. The $\{a_1, \ldots a_{n_A}\}$ values are going to be mapped into a different set $\{a'_1, \ldots a'_{n_A}\}$. The assumption here is that from an attacker's perspective, the remapped data is still valuable. The problem of remapping becomes clear during the mark detection phase when, after tuple fitness selection, the bit decoding mechanism fails and is unable to determine t such that $T_j(A)=a_t$. Instead, the decoding mechanism determines a t value that maps to the $\{a'_1, \ldots a'_{n_A}\}$ value set. Thus, the main challenge is to discover the mapping, or a major part of it, and apply its inverse during the detection phase.

Unless the items in the initial set $\{a_1, \ldots a_{n_A}\}$ feature a peculiar distinguishing property, this task is problematic for the general case, as there are a large number of possible mappings. Nevertheless, over large data sets, such a distinguishing property might exist, namely the value occurrence frequency for the items in $\{a_1, \ldots a_{n_A}\}$. This frequency was sampled in the remapped dataset and the resulting estimates $(E[f_A(a'_j)])_{j \in (1, n_A)})$ were compared with the known occurrence frequencies $((f_A(a_j))_{j \in (1, n_A)})$ Subsequently, both sets and associate items were sorted by comparing their values. For example if the closest value to $E[f_A(a'_i)]$ (in the set $(E[f_A(a'_j)])_{j \in (1, n_A)}$) is $f_A(a_j)$ (in the set $(f_A(a_j))_{j \in (1, n_A)}$, then we add i→j to the inverse mapping to be used at watermark decoding time.

While it does a good job in watermark embedding, data alteration is an expensive operation because it effectively destroys valuable data. There are also other data transformations that may be made use of, each with a different degree of associated data distortion and benefits. In particular, data addition features a much lower data distortion rate (no actual alterations) and thus presents potentially higher benefits. On the other hand, there likely exists an upper bound on the number of tuples that may be added to the data. $P_{add}$ may be defined as the upper bound on the allowed additional percentage of tuples to be added. In addition to the initial data altering step, watermarked tuples that conform to the "fitness" criteria (while conforming to the overall data distribution, in order to preserve stealthiness) may be artificially injected.

The data addition of "fit" tuples is not inhibited by the one-way nature of the used cryptographic hash. Because c effectively reduces the fitness criteria testing space to a cardinality of c, one may massively produce random tuple values (within the appropriate attribute data domain) and test for "fitness." On average, depending upon the randomness of the tuple producing mechanism, one in every c tuples should conform as the values are evaluated modulo c. Furthermore, if a percentage of $P_{add}$ artificially produced tuples which are to be added to the data, the watermark is effectively enforced with an additional $P_{add} \times N$ bits.

The method directed toward watermarking categorical relational data also was implemented by a Java proof-of-concept of the watermarking algorithm and deployed on categorical attributes in the Wal-Mart Sales Database. The experimental setup included access to 4 TBytes of data, formerly hosted on a NCR Teradata machine, one 1.6 GHz CPU Linux box with Sun JDK 1.4 and 384 MB RAM. The ItemScan relation contains over 840 million tuples. The algorithm was tested upon a randomly selected subset of size equal to a small percentage of the original data size (e.g., just a maximum of 141,000 tuples for relation UnivClassTables.ItemScan). The relational schema included the attributes:

Visit_Nbr INTEGER PRIMARY KEY,
Item_Nbr INTEGER NOT NULL

Item_Nbr, a categorical attribute, uniquely identifying a finite set of products, was selected to test the watermarking algorithm. The watermark considered was 10 bits long, all the presented data is the result of an averaging process with 15 passes (each seeded with a different key), aimed at smoothing out data dependent biases and singularities.

Figure 14:
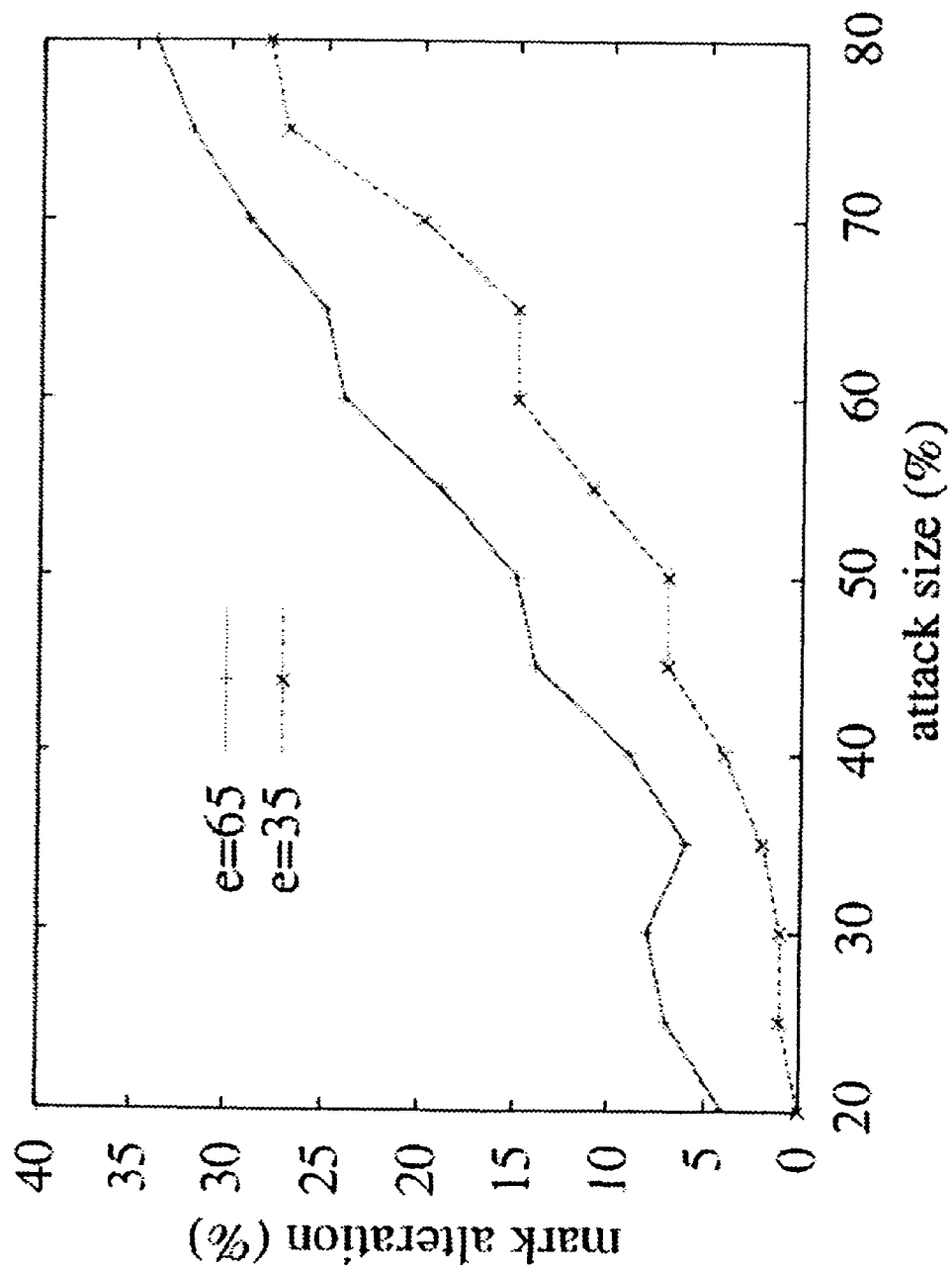
FIG. 14 is a depiction of the watermark degradation with respect to increasing attack size.

FIG. 14 illustrates that the watermark may degrade gracefully with increasing attack size for two values of e. As the attack size grows (random alterations to the data), the watermark distortion increases. The error correction mechanism, majority voting in this case, does a good job in error recovery.

Figure 15:
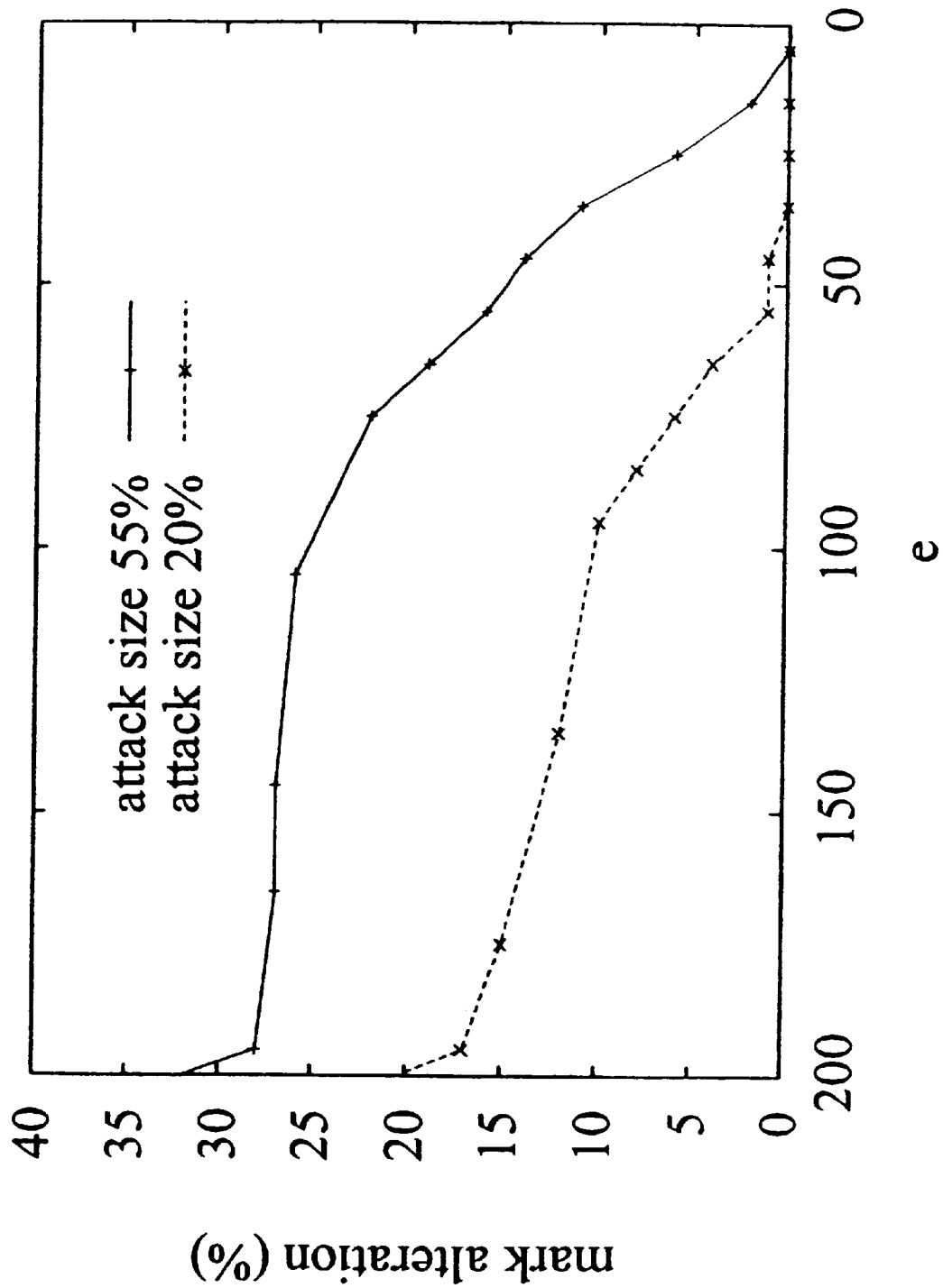
FIG. 15 is a depiction of the attack resilience with respect to increasing available bandwidth.
Figure 16:
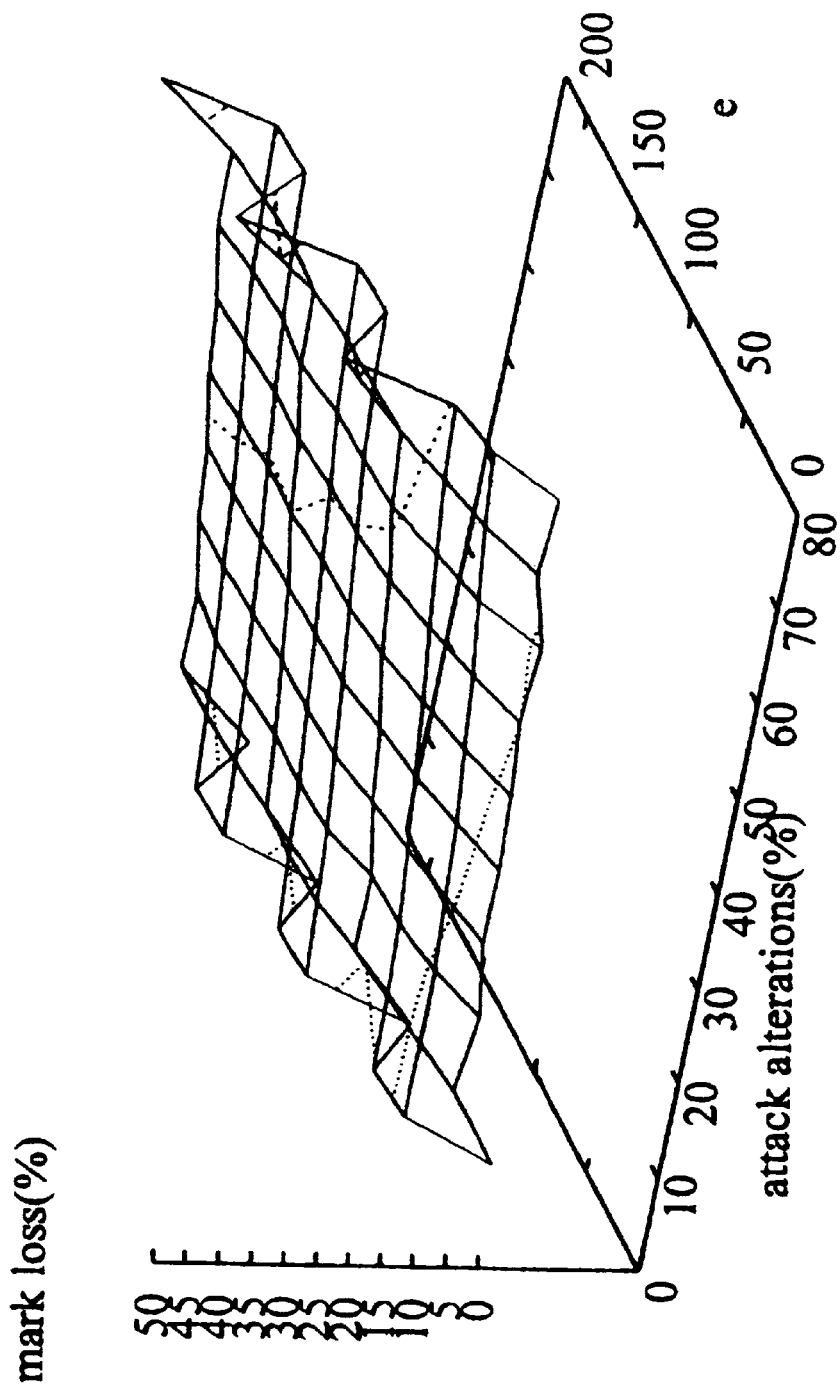
FIG. 16 is a depiction of the watermark alteration surface with varying confidence factors and attack sizes.

FIG. 15 illustrates that more available bandwidth (decreasing e) may result in a higher attack resilience. As e increases (decreasing number of encoding alterations) the vulnerability to random alteration attacks increases accordingly. Hence, a trade-off exists between the requirement to be resilient and the preservation of data quality (e.g., fewer alterations). FIG. 16 illustrates the watermark alteration surface with varying c and attack size a.

Figure 17:
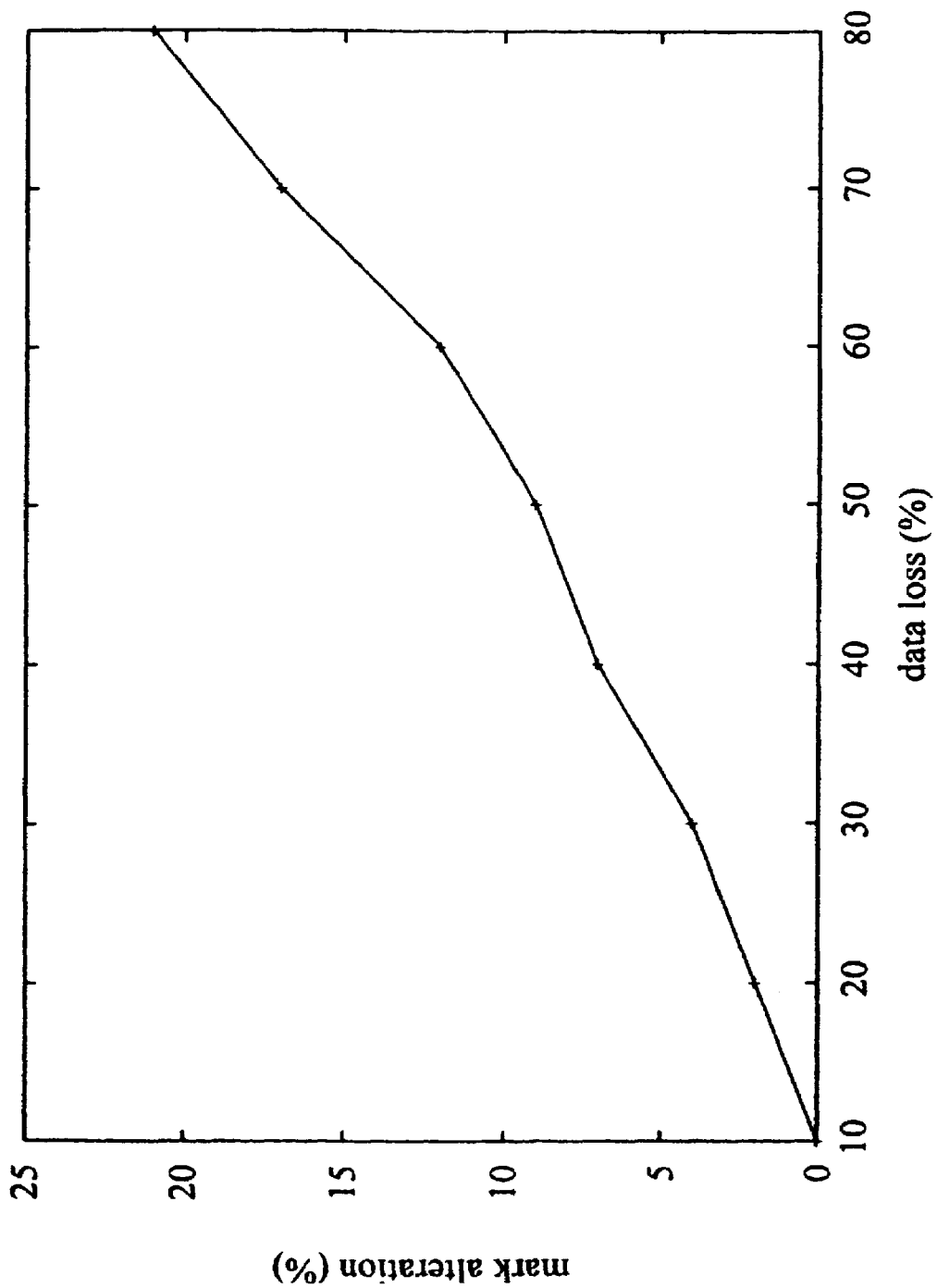
FIG. 17 is a depiction of the watermark degradation with respect to increasing data loss.

Additionally, the watermark may degrade almost linearly with increasing data loss, as illustrated in FIG. 17. Note the compensating effect of error correction. Compared to data alteration attacks, the watermark survives even better with respect to the attack size (in this case loss of data).

Watermarking categorical data is extremely resilient to both alteration and data loss attacks, for example tolerating up to 80% data loss with a watermark alteration of only 25%.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

The invention claimed is:

1. A method of watermarking digital data, comprising:
receiving a digital data collection to be watermarked;
partitioning the digital data collection into items;
creating a sorted collection of the items having a secret ordering of the items by sorting the items based upon a cryptographic keyed hash of a set of most significant bits of normalized versions of the items;
building unique, non-intersecting subsets of data from the sorted collection of the items; and
embedding at least one watermark bit into each unique, non-intersecting subset, whereby the digital data is watermarked.

2. The method of claim 1, comprising detecting a watermark by utilizing the secret ordering of the items as a key.

3. The method of claim 1, comprising detecting a watermark by recovering the embedded bit value of a majority of the unique, non-intersecting subsets.

4. The method of claim 1, comprising detecting a watermark by utilizing error correction.

5. The method of claim 1, the unique, non-intersecting subsets each having subset boundary markers that are computed and stored for use during watermark detection.

6. The method of claim 1, comprising receiving at least one user selected usability metric in the form of an external usability plug-in module, the plug-in module allows user-defined query metrics to be deployed and queried during runtime.

7. The method of claim 6, comprising determining if any usability metric has been exceeded, and if so, changing the watermark encoding parameters.

8. The method of claim 6, comprising, as the watermark embedding progresses, instructing a processor to increase an embedding aggressiveness factor to permit the changes to the subset data to become closer to the allowable usability metric limits.

9. The method of claim 1, wherein from about 40% to about 45% of the watermark survives up to from about 45% to about 50% of original data loss for numeric relational data.

10. A method of watermarking digital data in accordance with at least one user specified usability metric, comprising:
receiving a digital data collection to be watermarked;
receiving at least one user specified usability metric that limits the available bandwidth for watermark encoding;
sorting items in the digital data collection based upon a one-way secretly keyed, cryptographic hash of a set of most significant bits (MSB) of normalized versions of the items to create a sorted collection of secretly ordered items;

selecting a number of unique, non-intersecting subsets of the secretly ordered items from the sorted collection;

for each unique, non-intersecting subset, embedding at least one watermark bit into the unique, non-intersecting subset; and determining whether any usability metric has been exceeded.

11. The method of claim 10, wherein, for each unique, non-intersecting subset, the watermark encoding parameters are changed if any usability metric has been exceeded.

12. The method of claim 10, comprising increasing the aggressiveness of the embedding during watermark encoding via a processor to permit the changes to the subset data to become closer to the allowable usability metric limits.

13. The method of claim 10, comprising embedding a multi-bit watermark.

14. The method of claim 10, comprising utilizing a set of external usability plug-in modules to permit the user to specify any usability metric to be used at run-time.

* * * * *